US010403927B2

(12) United States Patent
Sabi et al.

(10) Patent No.: US 10,403,927 B2
(45) Date of Patent: *Sep. 3, 2019

(54) THIN FILM SOLID STATE LITHIUM ION SECONDARY BATTERY AND METHOD OF MANUFACTURING THE SAME

(71) Applicant: MURATA MANUFACTURING CO., LTD., Kyoto (JP)

(72) Inventors: Yuichi Sabi, Tokyo (JP); Katsunori Takahara, Kanagawa (JP); Hiroyuki Morioka, Kanagawa (JP); Tatsuya Furuya, Kanagawa (JP); Koichiro Hinokuma, Kanagawa (JP); Reina Ichikawa, Kanagawa (JP); Yui Senda, Kanagawa (JP); Momoe Adachi, Tokyo (JP)

(73) Assignee: MURATA MANUFACTURING CO., LTD. (JP)

(*) Notice: Subject to any disclaimer, the term of this patent is extended or adjusted under 35 U.S.C. 154(b) by 183 days.

This patent is subject to a terminal disclaimer.

(21) Appl. No.: 15/585,951

(22) Filed: May 3, 2017

(65) Prior Publication Data

US 2017/0301948 A1    Oct. 19, 2017

Related U.S. Application Data

(63) Continuation of application No. 13/144,625, filed as application No. PCT/JP2010/051127 on Jan. 28, 2010, now Pat. No. 9,673,481.

(30) Foreign Application Priority Data

Feb. 3, 2009  (JP) ................................ 2009-022596
Oct. 8, 2009  (JP) ................................ 2009-234100

(51) Int. Cl.
*H01M 10/05* (2010.01)
*H01M 10/0525* (2010.01)
(Continued)

(52) U.S. Cl.
CPC ..... *H01M 10/0525* (2013.01); *H01M 2/0212* (2013.01); *H01M 4/131* (2013.01);
(Continued)

(58) Field of Classification Search
CPC ... H01M 10/05; H01M 10/054; H01M 10/126
See application file for complete search history.

(56) References Cited

U.S. PATENT DOCUMENTS 5,147,739 A * 9/1992 Beard ................. H01M 4/0459
                                                    429/218.1
9,673,481 B2 * 6/2017 Sabi ..................... H01M 2/0212
(Continued)

*Primary Examiner* — Jeremiah R Smith
(74) *Attorney, Agent, or Firm* — Sheridan Ross P.C.

(57) ABSTRACT

In one embodiment, a thin film solid state lithium ion secondary battery is able to be charged and discharged in the air and is able to be manufactured stably at a favorable yield. The thin film solid state lithium ion secondary battery has an electric insulating substrate formed from an organic resin, an inorganic insulating film provided on the substrate face, a cathode-side current collector film, a cathode active material film, a solid electrolyte film, an anode potential formation layer, and an anode-side current collector film. The cathode-side current collector film and/or the anode-side current collector film is formed on the inorganic insulating film face. The anode potential formation layer is a layer formed from the same material as that of the cathode active material film or a material different from that of the cathode active material film and is a layer provided for forming anode potential at the time of discharge.

32 Claims, 20 Drawing Sheets

(51) Int. Cl.
*H01M 2/02* (2006.01)
*H01M 4/131* (2010.01)
*H01M 4/136* (2010.01)
*H01M 6/40* (2006.01)
*H01M 10/0562* (2010.01)
*H01M 10/0585* (2010.01)
*H01M 10/054* (2010.01)
*H01M 10/12* (2006.01)
*H01M 4/1391* (2010.01)
*H01M 4/1397* (2010.01)

(52) U.S. Cl.
CPC ............. *H01M 4/136* (2013.01); *H01M 6/40* (2013.01); *H01M 10/0562* (2013.01); *H01M 10/0585* (2013.01); *H01M 4/1391* (2013.01); *H01M 4/1397* (2013.01); *H01M 10/05* (2013.01); *H01M 10/054* (2013.01); *H01M 10/126* (2013.01); *Y02P 70/54* (2015.11); *Y10T 29/49108* (2015.01); *Y10T 29/49115* (2015.01)

(56) References Cited

U.S. PATENT DOCUMENTS

| | | | |
|---|---|---|---|
| 2003/0019942 A1* | 1/2003 | Blossom | G06K 19/0701 235/492 |
| 2003/0099884 A1* | 5/2003 | Chiang | G02F 1/1523 429/233 |
| 2005/0079418 A1* | 4/2005 | Kelley | C23C 14/042 429/231.95 |
| 2006/0286448 A1* | 12/2006 | Snyder | H01M 2/0275 429/176 |
| 2008/0032236 A1* | 2/2008 | Wallace | H01M 6/40 430/319 |
| 2009/0042101 A1* | 2/2009 | McGervey | H01M 4/0438 429/220 |

* cited by examiner (A)
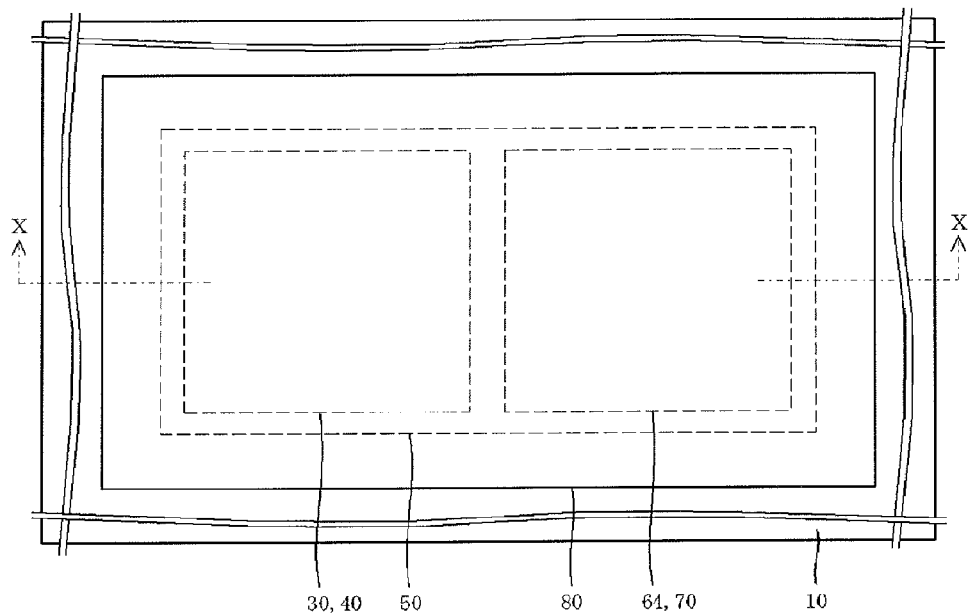
30, 40   50        80   64, 70      10
(B)
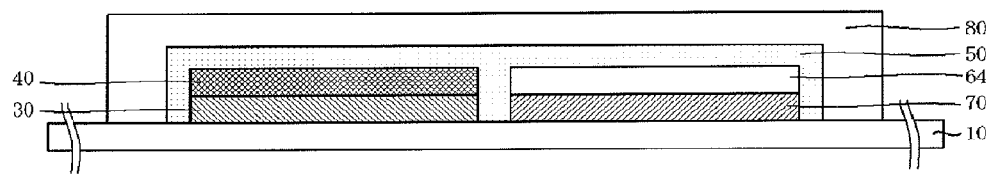
FIG. 2

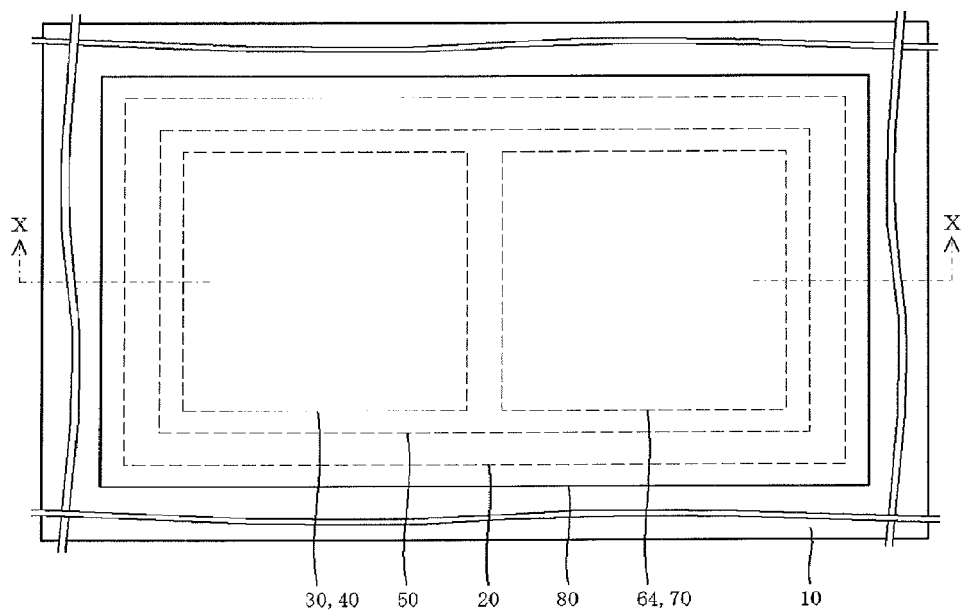
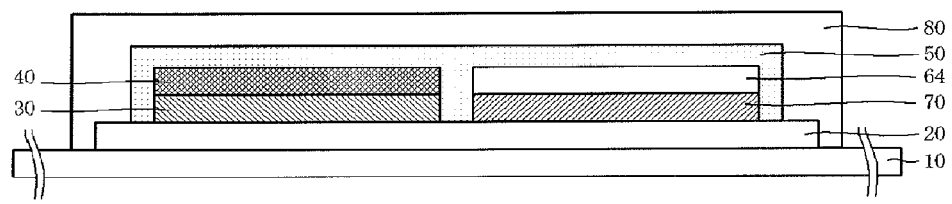
FIG. 4

(A) STRUCTURES OF RESPECTIVE LAYERS OF SOLID STATE LITHIUM ION BATTERIES IN EXAMPLES

| LAMINATION STRUCTURE | EXAMPLE 1 | EXAMPLE 2 | EXAMPLE 3 |
|---|---|---|---|
| OVERALL PROTECTIVE FILM (ULTRAVIOLET CURING RESIN) ($\mu$m) | 20 | 20 | 20 |
| ANODE-SIDE CURRENT COLLECTOR FILM (Ti) (nm) | 200 | 200 | 200 |
| ANODE POTENTIAL FORMATION LAYER (nm) | $LiMn_2O_4$ 6 | $LiMn_2O_4$ 13 | $LiMn_2O_4$ 10 |
| SOLID ELECTROLYTE FILM ($Li_3PO_4N_x$) (nm) | 145 | 145 | 145 |
| CATHODE ACTIVE MATERIAL FILM ($LiMn_2O_4$) (nm) | 125 | 125 | 125 |
| CATHODE-SIDE CURRENT COLLECTOR FILM (Ti) (nm) | 100 | 100 | 100 |
| PC SUBSTRATE (mm) | 1.1 | 1.1 | 1.1 |

(B) STRUCTURES OF RESPECTIVE LAYERS OF SOLID STATE LITHIUM ION BATTERIES IN COMPARATIVE EXAMPLES

| LAMINATION STRUCTURE | COMPARATIVE EXAMPLE 1 | COMPARATIVE EXAMPLE 2 |
|---|---|---|
| OVERALL PROTECTIVE FILM (ULTRAVIOLET CURING RESIN) ($\mu$m) | 20 | 20 |
| ANODE-SIDE CURRENT COLLECTOR FILM (Ti) (nm) | 200 | 200 |
| ANODE POTENTIAL FORMATION LAYER (nm) | ITO 20 (ANODE ACTIVE MATERIAL FILM) | — — |
| SOLID ELECTROLYTE FILM ($Li_3PO_4N_x$) (nm) | 145 | 145 |
| CATHODE ACTIVE MATERIAL FILM ($LiMn_2O_4$) (nm) | 125 | 125 |
| CATHODE-SIDE CURRENT COLLECTOR FILM (Ti) (nm) | 100 | 100 |
| PC SUBSTRATE (mm) | 1.1 | 1.1 |

FIG. 6

THIN FILM SOLID STATE LITHIUM ION SECONDARY BATTERY AND METHOD OF MANUFACTURING THE SAME

CROSS REFERENCE TO RELATED APPLICATIONS

The present application is a continuation of U.S. patent application Ser. No. 13/144,625, filed Jul. 14, 2011, which is a National Stage of International Application Serial No. PCT/JP2010/051127, filed Jan. 28, 2010, which claims priority to Japanese Patent Application Serial No. 2009-234100, filed in the Japanese Patent Office on Oct. 8, 2009, and Japanese Patent Application Serial No. 2009-022596, filed in the Japanese Patent Office on Feb. 3, 2009, the entire contents of which are incorporated herein by reference in their entirety.

BACKGROUND

The present invention relates to a lithium ion battery, and particularly relates to a thin film solid state lithium ion secondary battery in which all layers that are formed on a substrate and compose the battery are able to be formed by dry process, and a method of manufacturing the same.

A lithium ion secondary battery has a higher energy density and more superior charge and discharge cycle characteristics compared to other secondary batteries, and thus the lithium ion secondary battery is widely used as an electric power source of a mobile electronic device. In the lithium ion secondary battery using an electrolytic solution as an electrolyte, reducing its size and its thickness is limited. Thus, a polymer battery using a gel electrolyte and a thin film solid state battery using a solid electrolyte have been developed.

In the polymer battery using the gel electrolyte, reducing its thickness and its size is more easily enabled than in batteries using an electrolytic solution. However, reducing its thickness and its size is limited in order to securely seal the gel electrolyte. The thin film solid state battery using the solid electrolyte is composed of layers formed on a substrate, that is, is composed of an anode current collector film, an anode active material film, a solid electrolyte film, a cathode active material film, and a cathode current collector film. In the thin film solid state battery using the solid electrolyte, its thickness and its size are able to be more decreased by using a thin substrate or a thin solid electrolyte film as a substrate. Further, in the thin film solid state battery, a solid nonaqueous electrolyte is able to be used as an electrolyte and the all respective layers composing the battery are able to be solid. Thus, there is no possibility that deterioration is caused by leakage, and a member for preventing leakage and corrosion is not necessitated differently from in the polymer battery using the gel electrolyte. Accordingly, in the thin film solid state battery, the manufacturing process is able to be simplified, and safety thereof may be high.

In the case where decreasing its size and its thickness is realized, the thin film solid state battery is able to be built onto an electric circuit board in a manner of on-chip. Further, in the case where a polymer substrate is used as an electric circuit board and the thin film solid state battery is formed thereon, a flexible battery is able to be formed. Such a flexible battery is able to be built in a card electronic money, an RF ID tag and the like.

For the thin film solid state lithium ion secondary battery in which the all layers composing the battery are formed from solid described above, many reports have been made.

First, in the after-mentioned Patent document 1 entitled "SEMICONDUCTOR SUBSTRATE MOUNTED SECONDARY BATTERY," the following description is given.

In an embodiment of Patent document 1, an insulating film is formed on a silicon substrate, a wiring electrode is formed thereon, and a cathode and an anode are respectively arranged in line on the wiring electrode. That is, the cathode and the anode are not layered. Since such arrangement is adopted, the thickness of the battery itself is able to be more decreased. Further, in the case of this embodiment, the substrate is able to be changed to an insulator.

Further, in the after-mentioned Patent document 2 entitled "THIN FILM SOLID STATE SECONDARY BATTERY AND COMPOUND DEVICE INCLUDING THE SAME," the following description is given.

A lithium ion thin film solid state secondary battery of Patent document 2 is formed by sequentially layering a current collector layer on a cathode side (cathode current collector layer), a cathode active material layer, a solid electrolyte layer, an anode active material layer, a current collector layer on an anode side (anode current collector layer), and a moisture barrier film on a substrate. It is to be noted that the lamination on the substrate may be made in the order of the current collector layer on the anode side, the anode active material layer, the solid electrolyte layer, the cathode active material layer, the current collector layer on the cathode side, and the moisture barrier film.

As the substrate, glass, semiconductor silicon, ceramic, stainless steel, a resin substrate or the like is able to be used. As the resin substrate, polyimide, PET (polyethylene terephthalate) or the like is able to be used. Further, as long as handling is available without deformation, a flexible thin film is able to be used as the substrate. The foregoing substrates preferably have additional characteristics such as characteristics to improve transparency, characteristics to prevent diffusion of alkali element such as Na, characteristics to improve heat resistance, and gas barrier characteristics. To this end, a substrate in which a thin film such as $SiO_2$ and $TiO_2$ is formed on the surface by sputtering method or the like may be used.

Further, in the after-mentioned Patent document 3 entitled "METHOD OF MANUFACTURING ALL SOLID STATE LITHIUM SECONDARY BATTERY AND ALL SOLID STATE LITHIUM SECONDARY BATTERY," a description is given of an all solid state lithium secondary battery capable of avoiding short circuit between a cathode film and an anode film in a battery edge section.

Further, in the after-mentioned Non patent document 1, a description is given of fabricating a Li battery composed of a thin film formed by sputtering method.

As an anode of the existing bulk Li batteries, carbon is widely used. Further, though it has been considered to use other material, practical usage may be difficult in terms of durability and the like. For example, in experiments of the lithium ion secondary batteries, a Li metal is often used as a high capacity material for composing the anode, and thereby high electric potential is obtained. The Li metal has not been practically used as a component material of the anode for the following reason. That is, in the case where Li is precipitated on the metal surface on the anode side, Li is grown in the form of needles, activity is lowered, battery characteristics rapidly deteriorate, and there is a problem in durability.

In the after-mentioned Non patent document 2, a description is given of a lithium free thin film battery.

CITATION LIST

Patent Document

Patent document 1: Japanese Unexamined Patent Application Publication No. 10-284130 (paragraph 0032, FIG. 4)

Patent document 2: Japanese Unexamined Patent Application Publication No 2008-226728 (paragraphs 0024 to 0025, FIG. 1)

Patent document 3: Japanese Unexamined Patent Application Publication No. 2008-282687 (paragraphs 0017 to 0027)

Non Patent Document

Non patent document 1: J. B. Bates et al., "Thin-Film lithium and lithium-ion batteries," Solid State Ionics, 135, 33-45 (2000) (2. Experimental procedures, 3. Results and discussion)

Non patent document 2: B. J. Neudecker et al., "Lithium-Free Thin-Film Battery with In Situ Plated Li Anode," J. Electrochem. Soc., 147, 517-523 (2000) (Experimental)

SUMMARY

Regarding the solid electrolyte disclosed in Non patent document 1 described above, a thin film is able to be formed by sputtering method. In addition, since the solid electrolyte functions in a state of amorphous, crystallization by annealing is not necessitated.

Many materials used for a cathode of the existing bulk Li batteries are crystal of a Li-containing metal oxide such as $LiCoO_2$, $LiMn_2O_4$, $LiFePO_4$, and $LiNiO_2$. Such a material is generally used in a state of crystal phase. Thus, in the case where a film is formed by thin film formation process such as sputtering method, in general, a substrate should be heated in forming the film and post annealing should be made after forming the film. Thus, a material with high heat resistance is used for the substrate, resulting in high cost. Further, heating process leads to longer takt time. Further, heating process causes electrode oxidation and intcrelectrode short circuit due to structure change at the time of cathode material crystallization, resulting in yield lowering. Meanwhile, in the case where a cathode active material is amorphous, since the internal resistance is high, voltage drop becomes problematic.

In terms of manufacturing cost of the battery, a plastic substrate is preferably used. Further, from a viewpoint of using a flexible substrate, the plastic substrate is preferably used as well. In view of manufacturing cost of the battery, a material used for a cathode such as $LiCoO_2$, $LiMn_2O_4$, $LiFePO_4$, and $LiNiO_2$ is preferably formed on a plastic substrate at room temperature without providing post annealing.

The inventors of the present invention found the following. That is, the foregoing generally used cathode active materials are all deteriorated drastically to moisture. In the case where the water absorption coefficient of the plastic substrate is high, if the cathode active material is directly contacted with the substrate, generated deterioration causes short circuit, resulting in malfunction as a battery, or lowered manufacturing yield. Such deterioration and lowered manufacturing yield are not able to be solved even if a protective film to protect the respective layers composing the battery is formed after forming the respective layers composing the battery.

Further, in the case where a substrate with low water absorption coefficient such as quartz glass and a Si wafer is used, in all reports on the existing thin film batteries, charge and discharge experiments of the manufactured batteries have been conducted in a dry room or in an environment filled with inert gas such as Ar and nitrogen. The reason why the charge and discharge experiments of the manufactured batteries are conducted in the environment filled with the inert gas is the fact that the respective layers and the substrate composing the battery are subject to moisture contained in the air and their deterioration based on the moisture quickly proceeds. Thus, such experiments do not endorse practical utility.

In the existing bulk Li batteries, carbon is widely used as an anode. However, since sputtering rate for carbon is significantly slow, film formation by sputtering method is difficult, and mass productivity is significantly low.

In the technique described in the foregoing Non patent document 2, experiment of an anode in which Li is precipitated is performed in a thin film battery. An anode active material does not initially exist. At the time of the first charge, Li is precipitated on the anode-side current collector, which is a virtual anode active material. However, as a result, durability to repeated charge and discharge is low, which is not practical.

The invention is made to solve the above-mentioned problems, and it is an object of the present invention to provide a high-performance and inexpensive thin film solid state lithium ion secondary battery that is able to be charged and discharged in the air, enables stable driving, and is able to be manufactured stably at a favorable yield even if a film composing the battery is formed from an amorphous film, and a method of manufacturing the same.

The present invention relates to a thin film solid state lithium ion secondary battery including: an electric insulating substrate; a cathode-side current collector film; a cathode active material film; a solid electrolyte film; an anode potential formation layer; and an anode-side current collector film, in which the cathode-side current collector film, the cathode active material film, the solid electrolyte film, the anode potential formation layer, and the anode-side current collector film are formed on the electric insulating substrate, the anode potential formation layer is a layer formed from a material different from an anode active material and provided for forming anode potential at the time of charge.

Further, the present invention relates to a method of manufacturing a thin film solid state lithium ion secondary battery including the steps of: forming a cathode-side current collector film; forming a cathode active material film; forming a solid electrolyte film; forming an anode potential formation layer; and forming an anode-side current collector film, in which the anode potential formation layer is a layer formed From a material different from an anode active material and contacted with the anode-side current collector film and the solid electrolyte film and provided for forming anode potential at the time of charge.

The thin film solid state lithium ion secondary battery includes: the electric insulating substrate; the cathode-side current collector film; the cathode active material film; the solid electrolyte film; the anode potential formation layer; and the anode-side current collector film. The cathode-side current collector film, the cathode active material film, the solid electrolyte film, the anode potential formation layer, and the anode-side current collector film are formed on the electric insulating substrate, the anode potential formation layer is the layer formed from the material different from the anode active material and provided for forming anode potential at the time of charge. At the time of charge, a layer excessively containing Li is formed on the anode side interface of the solid electrolyte film. Thus, even if the cathode active material film, the solid state electrolyte film, and the anode potential formation layer are formed from an amorphous film, a thin film solid state lithium ion secondary battery as a high-performance and small thin film battery that is able to be charged and discharged in the air, that enables stable driving, and that is able to improve repeated charge and discharge characteristics and durability is able to be provided.

Further, according to the present invention, the method of manufacturing a thin film solid state lithium ion secondary battery includes the steps of: forming the cathode-side current collector film; forming the cathode active material film; forming the solid electrolyte film; forming the anode potential formation layer; and forming the anode-side current collector film, in which the anode potential formation layer is the layer formed from the material different from the anode active material and contacted with the anode-side current collector film and the solid electrolyte film and provided for forming anode potential at the time of charge. At the time of charge, a layer excessively containing Li is formed on the anode side interface of the solid electrolyte film. Thus, a method of forming a thin film solid state lithium ion secondary battery as a high-performance and small thin film battery that is able to be charged and discharged in the air, that enables stable driving, and that is able to improve repeated charge and discharge characteristics and durability even if the cathode active material film, the solid state electrolyte film, and the anode potential formation layer are formed from an amorphous film is able to be provided.

Additional features and advantages of the present invention are described herein, and will be apparent from the following Detailed Description and the Figures.

BRIEF DESCRIPTION OF THE FIGURES

FIG. 2 is a view explaining a schematic structure of a solid state lithium ion battery in an embodiment of the present invention.

FIG. 4 is a view explaining a schematic structure of a solid state lithium ion battery in an embodiment of the present invention.

FIG. 6 is a diagram explaining structures of respective layers of solid state lithium ion batteries in Examples and Comparative examples of the present invention.

DETAILED DESCRIPTION

Figure 1:
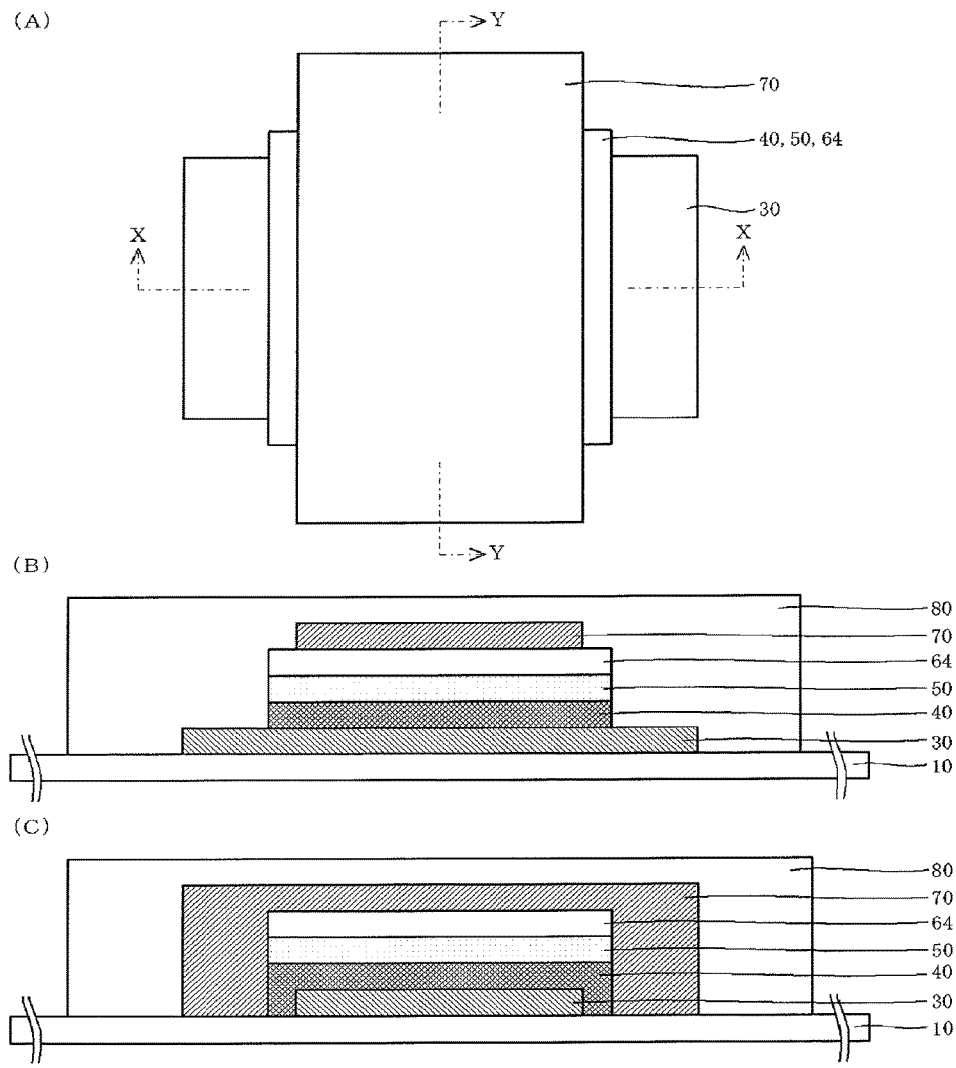
FIG. 1 is a view explaining a schematic structure of a solid state lithium ion battery in an embodiment of the present invention.

In a thin film solid state lithium ion secondary battery of the present invention, a structure in which an anode potential formation layer is formed from the same cathode active material as that of a cathode active material film or a cathode active material different from that of the cathode active material film is preferable. In the case where the anode potential formation layer is fowled from the same cathode active material as that of the cathode active material film or the cathode active material different from that of the cathode active material film, the thin film solid state lithium ion secondary battery is able to be structured with less kinds of materials.

Further, a structure in which the anode potential formation layer is formed from a material containing Li, and potential difference between the anode potential formation layer and the cathode active material film is a given value (2 V) or less is preferable. In the case where the anode potential formation layer is fowled from the material containing Li, and the potential difference between the anode potential formation layer and the cathode active material film is the given value (2 V) or less, a thin film solid state lithium ion secondary battery that has a sufficient drive voltage and that hardly generates short circuit is able to be provided.

Further, a structure in which the film thickness of the anode potential formation layer is 2 nm or more and 20 nm or less is preferable. With such a structure, anode potential is able to be formed in the anode potential formation layer at the time of charge, diffusion of Li into an anode-side current collector film is inhibited, the anode-side current collector film is able to be protected, and lowering of a battery capacity is able to be inhibited.

Further, a structure in which the film thickness of the anode potential formation layer is 2 nm or more and 13 nm or less is preferable. With such a structure, anode potential is able to be formed in the anode potential formation layer at the time of charge, diffusion of Li into the anode-side current collector film is inhibited, the anode-side current collector film is able to be protected, and lowering of a battery capacity is able to be more inhibited. For example, in the case where $LiMn_2O_4$ is used as a material composing the anode potential formation layer, since the film thickness of the anode potential formation layer is 2 nm or more and 13 nm or less, the battery capacity is about 30% or more of a capacity expected based on the theoretical capacity of the cathode active material (molecular weight (g/mol) of the cathode active material calculated based on Faradey constant), resulting in a battery having a practical use. In the case where the film thickness of the anode potential formation layer is less than 2 nm, it is difficult to realize mass production of the anode potential formation layer with a stable thickness, which is impractical. Further, in the case where the film thickness of the anode potential formation layer exceeds 13 nm, the battery capacity is lowered less than about 30% of the capacity expected based on the theoretical capacity of the cathode active material, the battery performance is lowered, which is impractical.

Further, a structure in which the film thickness of the anode potential formation layer is 3 nm or more and 10 nm or less is preferable. With such a structure, anode potential is able to be formed in the anode potential formation layer at the time of charge, diffusion of Li into the anode-side current collector film is inhibited, the anode-side current collector film is able to be protected, and lowering of a battery capacity is able to be more inhibited. For example, in the case where $LiMn_2O_4$ is used as a material composing the anode potential formation layer, since the film thickness of the anode potential formation layer is 3 nm or more and 10 nm or less, the anode potential formation layer is able to be stably formed with small variation of the film thickness even at the time of battery mass production. Accordingly, battery mass productivity is secured, the battery capacity value exceeding about 40% of the capacity expected based on the theoretical capacity of the cathode active material is able to be retained, resulting in a battery having a more practical use.

Further, a structure in which the film thickness of the anode potential formation layer is 3 nm or more and 6 nm or less is preferable. With such a structure, anode potential is able to be formed in the anode potential formation layer at the time of charge, diffusion of Li into the anode-side current collector film is inhibited, the anode-side current collector film is able to be protected, lowering of a battery capacity is able to be inhibited, and a large battery capacity is able to be retained. For example, in the case where $LiMn_2O_4$ is used as a material composing the anode potential formation layer, since the film thickness of the anode potential formation layer is 3 nm or more and 6 nm or less, battery mass productivity is secured, the battery capacity value exceeding about 80% of the capacity expected based on the theoretical capacity of the cathode active material is able to be retained, resulting in a battery having a more practical use.

Further, a structure in which the cathode active material film and the anode potential formation layer are respectively formed from $LiCoO_2$ is preferable. With such a structure, where the capacity that becomes the maximum when the film thickness of the anode potential formation layer is changed (referred to as maximum capacity) is 100%, the following is attained. That is, in the case where the thickness of the anode potential formation layer is 2 nm or more and 20 nm or less, the battery capacity is able to be 55% or more of the maximum capacity. In the case where the thickness of the anode potential formation layer is 2 nm or more and 13 nm or less, the battery capacity is able to be 65% or more of the maximum capacity. In the case where the thickness of the anode potential formation layer is 3 nm or more and 10 nm or less, the battery capacity is able to be 75% or more of the maximum capacity. In the case where the thickness of the anode potential formation layer is 3 nm or more and 6 nm or less, the battery capacity is able to be 90% or more of the maximum capacity.

Further, a structure in which the cathode active material film and the anode potential formation layer are respectively formed from $LiMn_2O_4$ is preferable. With such a structure, where the capacity that becomes the maximum when the film thickness of the anode potential formation layer is changed (referred to as maximum capacity) is 100%, the following is attained. That is, in the case where the thickness of the anode potential formation layer is 2 nm or more and 20 nm or less, the battery capacity is able to be 15% or more of the maximum capacity. In the case where the thickness of the anode potential formation layer is 2 nm or more and 13 nm or less, the battery capacity is able to be 35% or more of the maximum capacity. In the case where the thickness of the anode potential formation layer is 3 nm or more and 10 nm or less, the battery capacity is able to be 45% or more of the maximum capacity. In the case where the thickness of the anode potential formation layer is 3 nm or more and 6 nm or less, the battery capacity is able to be approximately the maximum capacity.

Further, a structure in which an electric insulating substrate is a substrate formed from an organic resin, an insulating film formed from an inorganic material is provided on the substrate face, and a cathode-side current collector film and/or an anode-side current collector film is formed on the insulating film face is preferable. Since the electric insulating substrate is the substrate formed from the organic resin, the insulating film formed from the inorganic material is provided on the substrate face, and the cathode-side current collector film and/or the anode-side current collector film is formed on the insulating film face, even if the cathode active material film, a solid state electrolyte film, and the anode potential formation layer are formed as amorphous, these films are formed above the insulating film, and thus a high-performance and inexpensive thin film solid state lithium ion secondary battery that is able to be charged and discharged in the air, enables stable driving, and is able to improve durability is able to be provided.

Further, a structure in which the area of the insulating film is larger than the area of the cathode-side current collector film or the anode-side current collector film, or the total area of the cathode-side current collector film and the anode-side current collector film is preferable. Since the area of the insulating film is larger than the area of the cathode-side current collector film or the anode-side current collector film, or the total area of the cathode-side current collector film and the anode-side current collector film, moisture permeating the electric insulating substrate is able to be prevented by the insulating film. Thus, a high-performance and inexpensive thin film solid state lithium ion secondary battery that is able to inhibit influence of moisture on the cathode-side current collector film, the cathode active material film, the solid electrolyte film, the anode potential formation layer, and the anode-side current collector film that compose the battery and is able to improve durability is able to be provided.

Further, a structure in which the cathode active material film is formed from a material containing Li preferable. Since the cathode active material film is formed from the material containing Li, a thin film solid state lithium ion secondary battery having a large discharge capacity is able to be provided.

Further, a structure in which the cathode active material film is formed from an oxide containing at least one of Mn, Co, Fe, P, Ni, Si, and Cu and Li is preferable. Since the cathode active material film is formed from an oxide containing at least one of Mn, Co, Fe, P, Ni, Si, and Cu and Li, a thin film solid state lithium ion secondary battery that has a large discharge capacity is able to be provided.

Further, a structure in which a protective film that covers the cathode-side current collector film, the cathode active material film, the solid electrolyte film, the anode potential formation layer, and the anode-side current collector film and that is formed from an ultraviolet curing resin is provided is preferable. Since the protective film that covers the cathode-side current collector film, the cathode active material film, the solid electrolyte film, the anode potential formation layer, and the anode-side current collector film and that is formed from the ultraviolet curing resin is provided, intrusion of moisture and gas in the environment under which the thin film solid state lithium ion secondary battery is placed is able to be inhibited, and durability is able to be improved.

Further, a structure in which the anode-side current collector film is formed from Ti or an alloy having Ti as a main component is preferable. Since the anode-side current collector film is formed from Ti or the alloy having Ti as a main component, the cathode-side current collector film has superior conductivity and superior durability.

In a method of manufacturing a thin film solid state lithium ion secondary battery of the present invention, a structure in which a step of forming the insulating film formed from the inorganic material on the electric insulating substrate face formed from the organic resin and a step of forming the cathode-side current collector film and/or the anode-side current collector film on the insulating film face are included is preferable. Since the method of manufacturing a thin film solid state lithium ion secondary battery of the present invention includes the step of forming the insulating film formed from the inorganic material on the electric insulating substrate face formed from the organic resin and the step of forming the cathode-side current collector film and/or the anode-side current collector film on the insulating film face, the cathode-side current collector film and/or the anode-side current collector film is able to be formed on the insulating film face more tightly than in the case that the cathode-side current collector film and/or the anode-side current collector film is directly formed on the electric insulating substrate face. Thus, even if the cathode active material film, the solid electrolyte film, and the anode potential formation layer are formed as amorphous, these films are formed above the insulating film, and thus a high-performance and inexpensive thin film solid state lithium ion secondary battery that is able to be charged and discharged in the air, enables stable driving, is able to improve durability, and is able to be manufactured stably at improved manufacturing yield is able to be provided.

It is to be noted that in the following description, in some cases, "thin film solid state lithium ion secondary battery" is summarily given as "solid state lithium ion battery," "thin film lithium ion battery" or the like.

The thin film solid state lithium ion secondary battery based on the present invention has the electric insulating substrate formed from the organic resin, the inorganic insulating film provided on the substrate face, the cathode-side current collector film, the cathode active material film, the solid electrolyte film, the anode potential formation layer, and the anode-side current collector film. In the thin film solid state lithium ion secondary battery based on the present invention, the cathode-side current collector film and/or the anode-side current collector film is tightly formed on the inorganic insulating film face.

The anode potential formation layer is formed from a material capable of forming the cathode active material film, and is a layer in which anode potential is formed at the time of charge. The anode potential formation layer may be the same cathode active material as that of the cathode active material film or a cathode active material different from that of the cathode active material film. It is desirable that the anode potential formation layer be formed from a material containing Li, potential difference between the anode potential formation layer and the cathode active material film is a given value (for example, 2 V) or less, the battery capacity is about 30% or more of the capacity expected based on the theoretical capacity of the cathode active material considering practicality, and the thickness of the anode potential formation layer is 2 nm or more and 13 nm or less.

In battery mass production, in the case where a trial is made to form a stable film thickness of the anode potential formation layer, if the film thickness of the anode potential formation layer is less than 3 nm, the film thickness is varied at the time of film formation, and stability of the film thickness is easily lowered. Thus, in order to form the anode potential formation layer with a stable film thickness and secure battery mass productivity, the film thickness of the anode potential formation layer is desirably 3 nm or more. In order to secure battery mass productivity and retain a larger battery capacity, the film thickness of the anode potential formation layer is more preferably 3 nm or more and 10 nm or less and is much more preferably 3 nm or more and 6 nm or less.

The thickness of the inorganic insulating film is 5 nm or more and 500 nm or less, and contains at least any one of an oxide, a nitride, and a sulfide. The thin film solid state lithium ion secondary battery is able to be charged and discharged in the air, has high performance, and is able to be manufactured at favorable yield and inexpensively.

By setting the film thickness of the inorganic insulating film to 5 nm or more and 500 nm or less, short circuit generation caused by charge and discharge made immediately after manufacturing the battery (simply referred to as initial short circuit as well) is able to be prevented, short circuit due to repeated charge and discharge of the battery is able to be prevented, bending of the electric insulating substrate and impact are able to be tolerated and cracks are not generated. Thus, a high-performance and inexpensive thin film solid state lithium ion secondary battery that is able to prevent short circuit and is able to improve durability is able to be provided.

Further, by setting the film thickness of the inorganic insulating film to 10 nm or more and 200 nm or less, sufficient film thickness is more stably obtained, the defective fraction due to initial short circuit is able to be more decreased, and a function as a battery is able to be retained even if the electric insulating substrate is bent.

In the present invention, at the time of manufacturing the all solid state thin film lithium battery, the anode active material film is not formed, and the anode potential formation layer is formed instead of the anode active material film. The anode active material is generated on the anode side at the time of charge. The layer generated on the anode side is Li metal or a layer excessively containing Li on the anode side interface of the solid electrolyte film (hereinafter referred to as Li-excessive layer). Due to the Li-excessive layer formed by providing the anode potential formation layer, a voltage at the time of discharge is retained high. In addition, a structure in which it is easy to detect that discharge has been finished is possible, since the voltage is drastically lowered at the end of discharge.

Further, the all solid state thin film lithium battery has high durability to repeated charge and discharge without losing charge and discharge characteristics while excessively deposited Li (Li-excessive layer) is used as an anode active material.

In general, the anode potential formation layer can be formed from a material capable of forming the cathode active material film. The anode potential formation layer may be the same cathode active material as that of the cathode active material film or may be a cathode active material different from that of the cathode active material film. However, the anode potential formation layer is preferably formed from the same material as the cathode active material for the following reason. That is, since potential of the cathode active material is the same as that of the anode potential formation layer, potential when the Li-excessive layer disappears at the time of discharge, potential is drastically lowered down to 0 V. Specifically, in general, as the cathode active material, an oxide containing at least one of Mn, Co, Fe, P, Ni, Si, and Cu and Li is used. The anode potential formation layer is formed from a thin film layer made of the same cathode active material as that of a cathode active material film or a cathode active material different from that of the cathode active material film. Otherwise, other material is able to be used for forming the anode potential formation layer in the case where the material has potential close to that of the cathode active material.

As described above, the anode potential formation layer is a layer for forming potential in the case where the Li-excessive layer disappears (that is, at the time of charge after the Li-excessive layer disappears at the time of discharge, the Li-excessive layer is formed again). Further, in the case where the anode potential formation layer is formed from a material containing Li, even if Li is excessively inserted at the time of charge, Li insertion amount is limited. Thus, there is an advantage that deterioration of charge capacity is little. Further, Li diffusion into the anode-side current collector is able to be inhibited by the anode potential formation layer. Thus, deterioration of the current collector is able to be inhibited, and repeated charge and discharge characteristics are able to be significantly favorable.

The anode potential formation layer formed from a material generally used as a cathode active material is a layer provided for forming anode potential at the time of charge. Since the anode potential formation layer has effects to inhibit Li diffusion to the anode-side current collector and to protect the anode-side current collector, the anode potential formation layer is also an anode-side current collector protective film. Thus, the anode potential formation layer may be referred to as the anode-side current collector protective film.

As the film thickness of the anode potential formation layer is increased, impedance is increased and the charge and discharge capacity is lowered. Thus, the film thickness of the anode potential formation layer is preferably smaller. As the film thickness is smaller, the charge and discharge capacity is improved, while film smoothness is lowered, resulting in lowered durability and lowered yield. Accordingly, in terms of durability and yield, the film thickness of the anode potential formation layer is preferably large.

In addition, the thickness of the Li-excessive layer formed on the anode side interface of the solid electrolyte film is changed according to the thickness size of the cathode active material film. However, it is enough that the anode potential formation layer sufficiently functions as a protective film for the Li-excessive layer formed on the anode side interface of the solid electrolyte film. Thus, the film thickness of the anode potential formation layer has no direct relation with the thickness of the Li-excessive layer. Accordingly, the film thickness of the anode potential formation layer does not depend on the thickness of the cathode active material film.

In the present invention, in the case where a plastic substrate is used, the thin film solid state lithium ion secondary battery is formed on the substrate face, and the inorganic insulating film is formed at least on the section where the substrate is contacted with the battery of the substrate face, high manufacturing yield and high repeated charge and discharge characteristics are able to be realized.

In the case where an organic insulating substrate having high moisture permeation rate such as a polycarbonate (PC) substrate is used as a plastic substrate, moisture permeation from the substrate causes a defect. However, by providing the inorganic insulating film tightly at least in the region where the organic insulating substrate is contacted with the battery of the organic insulating substrate, moisture from atmosphere in which the substrate mounted with the battery is able to be blocked. By forming the inorganic insulating film on the substrate face, initial short circuit rate immediately after manufacturing is decreased, and manufacturing yield is improved. Further, since short circuit ratio after repeated charge and discharge is lowered, failure ratio is lowered. Further, improvement of the charge and discharge characteristics is able to be realized.

The foregoing inorganic insulating film is a simple body of an oxide, a nitride, or a sulfide of Si, Cr, Zr, Al, Ta, Ti, Mn, Mg, and Zn, or a mixture thereof. More specifically, the inorganic insulating film is $Si_3N_4$, $SiO_2$, $Cr_2O_3$, $ZrO_2$, $Al_2O_3$, $TaO_2$, $Mn_2O_3$, $MgO$, $ZnS$ or the like or a mixture thereof.

Since a sufficient film thickness is necessitated as the inorganic insulating film, the thickness of the inorganic insulating film is preferably 5 nm or more. Further, in the case where the inorganic insulating film is excessively large, since internal stress of the inorganic insulating film is high, film peeling and a crack are easily generated. In particular, in the case where the substrate has flexibility, such a crack is easily generated in the case where the substrate is bent, and thus the film thickness is preferably 500 nm or less.

In the present invention, at the time of manufacturing the all solid state thin film lithium battery, the anode active material film is not formed, and the anode potential formation layer formed from the same cathode active material as that of the cathode active material film or a cathode active material different from that of the cathode active material film is provided between the anode-side current collector film and the solid electrolyte film, or the anode potential formation layer formed from a material having potential (for example, 2 V or less) close to the standard electrode potential of the cathode active material film is provided between the anode-side current collector film and the solid electrolyte film. Further, the plastic substrate is used, the battery is formed on the substrate face, and the inorganic insulating film is formed at least on the section where the substrate is contacted with the battery out of the substrate face. Further, according to the present invention, while the plastic substrate is used and all film formation steps are performed at room temperature, a favorable drive voltage and high repeated charge and discharge characteristics are able to realized.

According to the present invention, even if the films composing the thin film lithium ion battery are formed from an amorphous film, a high performance thin film solid state lithium ion secondary battery that is able to be charged and discharged in the air, enables stable driving, and is able to improve charge and discharge characteristics and repeated charge and discharge durability is able to be realized.

Further, even if the films composing the battery are formed from an amorphous film, since the battery is provided on the inorganic insulating film formed on the substrate face, a high performance and inexpensive thin film solid state lithium ion secondary battery that is able to be charged and discharged in the air, enables stable driving, is able to improve durability, and is able to be manufactured stably at improved manufacturing yield is able to be realized.

A description will be hereinafter given in detail of the embodiments of the present invention with reference to the drawings.

In the embodiments described below, the anode active material film is not provided, and the anode potential formation layer formed from the same cathode active material as that of the cathode active material film or a cathode active material different from that of the cathode active material film is provided.

<Embodiment (1)>

FIG. 1 is a view explaining a schematic structure of a solid state lithium ion battery in an embodiment of the present invention. FIG. 1(A) is a plan view, FIG. 1(B) is an X-X cross sectional view, and FIG. 1(C) is a Y-Y cross sectional view.

As illustrated in FIG. 1, the solid state lithium ion battery has a laminated body in which a cathode-side current collector film 30, a cathode active material film 40, a solid electrolyte film 50, an anode potential formation layer 64, and an anode-side current collector film 70 are sequentially formed on a substrate (organic insulating substrate) 10. An overall protective film 80 made of, for example, an ultraviolet curing resin is formed to wholly cover the laminated body.

The battery film structure illustrated in FIG. 1 is the substrate/the cathode-side current collector film/the cathode active material film/the solid electrolyte film/the anode potential formation layer/the anode-side current collector film/the overall protective film.

In addition, a structure in which a plurality of the foregoing laminated bodies are sequentially layered on the substrate (organic insulating substrate) 10, are electrically connected in series, and are covered by the overall protective film 80 is also possible. Further, a structure in which a plurality of the foregoing laminated bodies are arranged in line on the substrate (organic insulating substrate) 10, are electrically connected in parallel or in series, and are covered by the overall protective film 80 is also possible.

Further, the foregoing laminated body is able to be formed in the order of the anode-side current collector film 70, the anode potential formation layer 64, the solid electrolyte film 50, the cathode active material film 40, and the cathode-side current collector film 30 on the substrate (organic insulating substrate) 10. That is, the battery film structure is able to be the substrate/the anode-side current collector film/the anode potential formation layer/the solid electrolyte film/the cathode active material film/the cathode-side current collector film/the overall protective film.

<Embodiment (2)>

FIG. 2 is a view explaining a schematic structure of a solid state lithium ion battery in an embodiment of the present invention. FIG. 2(A) is a plan view and FIG. 2(B) is an X-X cross sectional view.

FIG. 2 is a view explaining a schematic structure of a solid state lithium ion battery in an embodiment (2) of the present invention. FIG. 2(A) is a plan view and FIG. 2(B) is an X-X cross sectional view.

As illustrated in FIG. 2, the solid state lithium ion battery has a laminated body composed of the cathode-side current collector film 30 and the cathode active material film 40 and a laminated body composed of the anode-side current collector film 70 and the anode potential formation layer 64 that are formed on the substrate (organic insulating substrate) 10. The solid electrolyte film 50 is formed to wholly cover the foregoing two laminated bodies arranged in line on the substrate (organic insulating substrate) 10, and the overall protective film 80 made of, for example, an ultraviolet curing resin is formed to wholly cover the solid electrolyte film 50.

In addition, a structure in which a plurality of sets of the foregoing two laminated bodies are arranged in line on the substrate (organic insulating substrate) 10, are electrically connected in parallel or in series, and are covered by the overall protective film 80 is also possible.

Next, a description will be given of a structure of a solid state lithium ion battery in which an inorganic insulating film 20 is provided between the substrate (organic insulating substrate) 10 and the cathode-side current collector film 30.

<Embodiment (3)>

Figure 3:
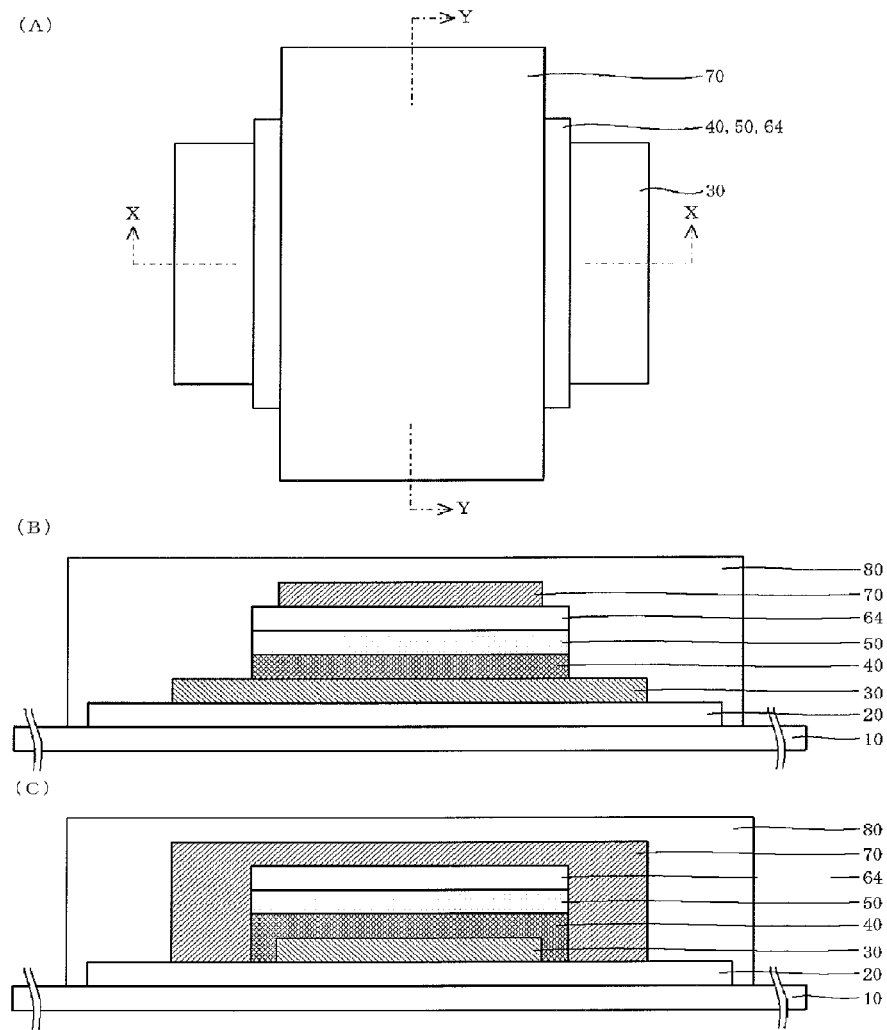
FIG. 3 is a view explaining a schematic structure of a solid state lithium ion battery in an embodiment of the present invention.

FIG. 3 is a view explaining a schematic structure of a solid state lithium ion battery in an embodiment of the present invention. FIG. 3(A) is a plan view, FIG. 3(B) is an X-X cross sectional view, and FIG. 3(C) is a Y-Y cross sectional view.

As illustrated in FIG. 3, the solid state lithium ion battery has the inorganic insulating film 20 formed on a face of the substrate (organic insulating substrate) 10. The solid state lithium ion battery has a laminated body in which the cathode-side current collector film 30, the cathode active material film 40, the solid electrolyte film 50, the anode potential formation layer 64, and the anode-side current collector film 70 are sequentially formed on the inorganic insulating film 20. The overall protective film 80 made of, for example, an ultraviolet curing resin is formed to wholly cover the laminated body and the inorganic insulating film 20.

The battery film structure illustrated in FIG. 3 is the substrate/the inorganic insulating film/the cathode-side current collector film/the cathode active material film/the solid electrolyte film/the anode potential formation layer/the anode-side current collector film/the overall protective film.

In addition, a structure in which a plurality of the foregoing laminated bodies are sequentially layered on the inorganic insulating film 20, are electrically connected in series, and are covered by the overall protective film 80 is also possible. Further, a structure in which a plurality of the foregoing laminated bodies are arranged in line on the inorganic insulating film 20, are electrically connected in parallel or in series, and are covered by the overall protective film 80 is also possible.

Further, the foregoing laminated body is able to be formed in the order of the anode-side current collector film 70, the anode potential formation layer 64, the solid electrolyte film 50, the cathode active material film 40, and the cathode-side current collector film 30 on the inorganic insulating film 20. That is, the battery film structure is able to be the substrate/ the inorganic insulating film/the anode-side current collector film/the anode potential formation layer/the solid electrolyte film/the cathode active material film/the cathode-side current collector film/the overall protective film.

<Embodiment (4)>

FIG. 4 is a view explaining a schematic structure of a solid state lithium ion battery in an embodiment of the present invention. FIG. 4(A) is a plan view and FIG. 4(B) is an X-X cross sectional view.

As illustrated in FIG. 4, the solid state lithium ion battery has the inorganic insulating film 20 formed on a face of the substrate (organic insulating substrate) 10. The solid state lithium ion battery has a laminated body composed of the cathode-side current collector film 30 and the cathode active material film 40 and a laminated body composed of the anode-side current collector film 70 and the anode potential formation layer 64 on the inorganic insulating film 20. The solid electrolyte film 50 is formed to wholly cover the foregoing two laminated bodies arranged in line on the inorganic insulating film 20, and the overall protective film 80 made of, for example, an ultraviolet curing resin is formed to wholly cover the solid electrolyte film 50.

In addition, a structure in which a plurality of sets of the foregoing two laminated bodies are arranged in line on the inorganic insulating film 20, are electrically connected in parallel or in series, and are covered by the overall protective film 80 is also possible.

[Manufacturing Process of the Solid State Lithium Ion Battery]

Figure 5:
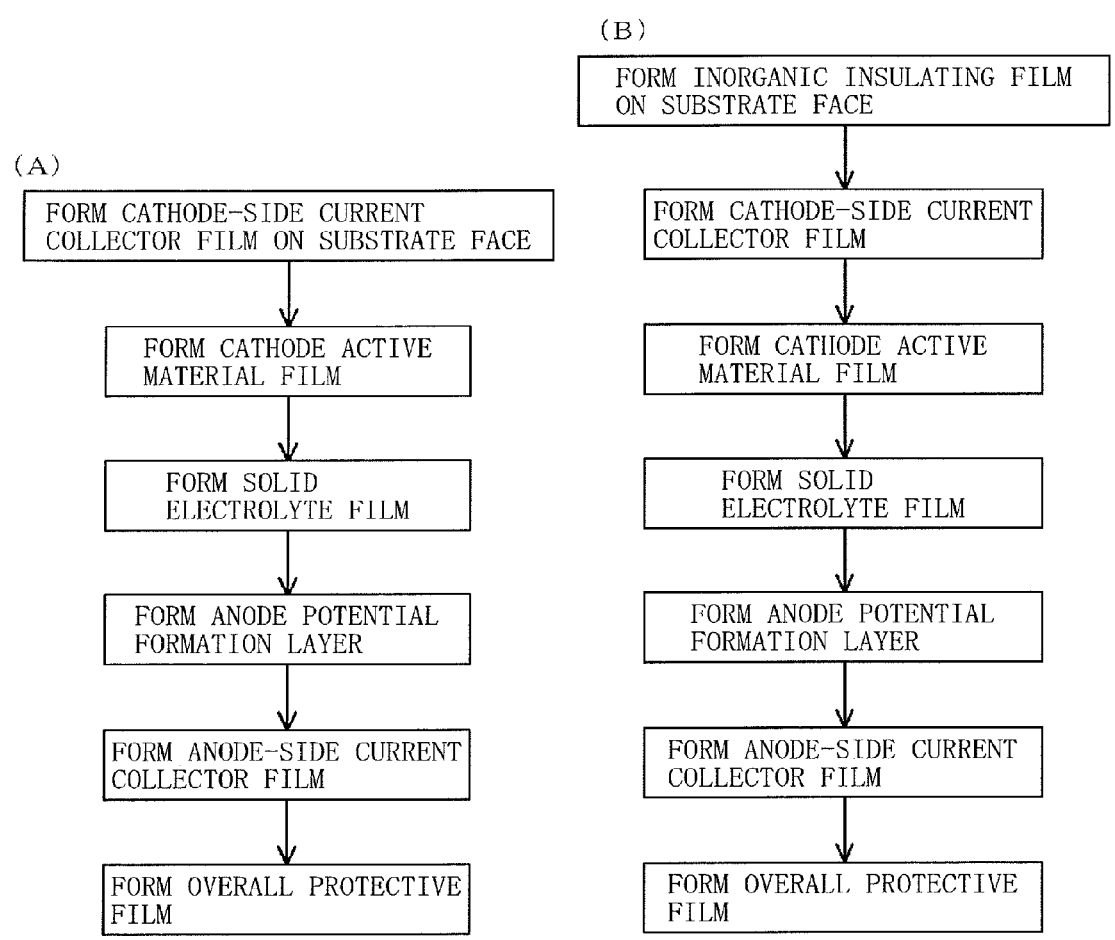
FIG. 5 is a diagram explaining short summary of manufacturing process of the solid state lithium ion battery in the embodiment of the present invention.

FIG. 5 is a diagram explaining short summary of manufacturing process of the solid state lithium ion battery in the embodiments of the present invention. FIG. 5(A) illustrates manufacturing process of the solid state lithium ion battery illustrated in FIG. 1, and FIG. 5(B) illustrates manufacturing process of the solid state lithium ion battery illustrated in FIG. 3.

As illustrated in FIG. 5(A), first, the laminated body is formed by sequentially forming the cathode-side current collector film 30, the cathode active material film 40, the solid electrolyte film 50, the anode potential formation layer 64, and the anode-side current collector film 70 on the substrate (organic insulating substrate) 10. Next, the overall protective film 80 made of, for example, an ultraviolet curing resin is formed on the substrate (organic insulating substrate) 10 to wholly cover the laminated body. Accordingly, the solid state lithium ion battery illustrated in FIG. 1 is able to be fabricated.

As illustrated in FIG. 5(B), first, the inorganic insulating film 20 is formed on the face of the substrate (organic insulating substrate) 10. Next, the laminated body is formed by sequentially forming the cathode-side current collector film 30, the cathode active material film 40, the solid electrolyte film 50, the anode potential formation layer 64, and the anode-side current collector film 70 on the inorganic insulating film 20. Finally, the overall protective film 80 made of, for example, an ultraviolet curing resin is formed on the substrate (organic insulating substrate) 10 to wholly cover the laminated body and the inorganic insulating film 20. Accordingly, the solid state lithium ion battery illustrated in FIG. 3 is able to be fabricated.

In addition, though not illustrated, the manufacturing process of the solid state lithium ion battery illustrated in FIG. 2 are as follows. First, the laminated body formed by sequentially forming the cathode-side current collector film 30 and the cathode active material film 40 and the laminated body formed by sequentially forming the anode-side current collector film 70 and the anode potential formation layer 64 are respectively arranged in line on the substrate (organic insulating substrate) 10.

Next, the solid electrolyte film 50 is formed to wholly cover the foregoing two laminated bodies arranged in line on the substrate (organic insulating substrate) 10. Finally, the overall protective film 80 made of, for example, an ultraviolet curing resin is formed on the inorganic insulating film 20 to wholly cover the solid electrolyte film 50.

Moreover, though not illustrated, the manufacturing process of the solid state lithium ion battery illustrated in FIG. 4 are as follows. First, the inorganic insulating film 20 is formed on the face of the substrate (organic insulating substrate) 10. Next, the laminated body formed by sequentially forming the cathode-side current collector film 30 and the cathode active material film 40 and the laminated body formed by sequentially forming the anode-side current collector film 70 and the anode potential formation layer 64 are respectively arranged in line on the inorganic insulating film 20.

Next, the solid electrolyte film 50 is formed to wholly cover the foregoing two laminated bodies arranged in line on the inorganic insulating film 20. Finally, the overall protective film 80 made of, for example, an ultraviolet curing resin is formed on the inorganic insulating film 20 to wholly cover the solid electrolyte film 50.

In the embodiments described above, as a material composing the solid state lithium ion battery, the following materials are able to be used.

As a material composing the solid electrolyte film 50, lithium phosphate ($Li_3PO_4$), $Li_3PO_4N_x$ (generally called LiPON) obtained by adding nitrogen to lithium phosphate ($Li_3PO_4$), $LiBO_2N_x$, $Li_4SiO_4$—$Li_3PO_4$, $Li_4SiO_4$—$Li_3VO_4$ and the like are able to be used. In addition, in the solid state lithium ion batteries illustrated in FIG. 2 and FIG. 4, since movement distance of lithium ions is long, it is preferable to use a solid electrolyte material having high ion conductivity.

As a material capable of composing the cathode active material film 40, a material that easily extracts and inserts lithium ions and that is able to make the cathode active material film extract and insert many lithium ions may be used. As such a material, $LiMnO_2$ (lithium manganese), a lithium-manganese oxide such as $LiMn_2O_4$ and $Li_2Mn_2O_4$, $LiCoO_2$ (lithium cobalt oxide), a lithium-cobalt oxide such as $LiCo_2O_4$, $LiNiO_2$ (lithium nickel oxide), a lithium-nickel oxide such as $LiNi_2O_4$, a lithium-manganese-cobalt oxide such as $LiMnCoO_4$ and $Li_2MnCoO_4$, a lithium-titanium oxide such as $Li_4Ti_5O_{12}$ and $LiTi_2O_4$, in addition, $Li_2CuO_2$, $LiCuO_2$, $LiVO_2$, $LiV_2O_4$, $LiCrO_2$, $LiFeO_2$, $LiTiO_2$, $LiScO_2$, $LiYO_2$, $LiMCrO_4$, $LiNiVO_4$, $LiCoVO_4$, $LiFePO_4$ (lithium iron phosphate), $LiCuPO_4$, $LiNiPO_4$, $LiCoPO_4$, $LiMnPO_4$, $Li_2NiPO_4F$, $Li_2CoPO_4F$, $Li_2MnPO_4F$, $Li_2FePO_4F$, $LiVOPO_4$, $Li_3V_2(PO_4)_3$, $Li_2MnSiO_4$, $Li_2FeSiO_4$, $Li_2CoSiO_4$, $Li_2NiSiO_4$ titanium sulfide ($TiS_2$), molybdenum sulfide ($MoS_2$), iron sulfide (FeS, $FeS_2$), copper sulfide (CuS), nickel sulfide ($Ni_3S_2$), bismuth oxide ($Bi_2O_3$), bismuth plumbate ($Bi_2Pb_2O_5$), copper oxide (CuO), vanadium oxide ($V_6O_{13}$), niobium selenide ($NbSe_3$) and the like are able to be used. Further, the foregoing materials are able to be used by mixture as well.

The anode potential formation layer 64 is selected from the foregoing materials capable of forming the cathode active material film 40.

As a material composing the cathode-side current collector film 30 and the anode-side current collector 70, Cu, Mg, Ti, Fe, Co, Ni, Zn, Al, Ge, In, Au, Pt, Ag, Pd and the like or an alloy containing any of the foregoing elements is able to be used.

As a material composing the inorganic insulating film 20, any material that is able to form a film having low moisture absorption characteristics and moisture resistance may be used. As such a material, a simple body of an oxide, a nitride, or a sulfide of Si, Cr, Zr, Al, Ta, Ti, Mn, Mg, and Zn, or a mixture thereof is able to be used. More specifically, $Si_3N_4$, $SiO_2$, $Cr_2O_3$, $ZrO_2$, $Al_2O_3$, $TaO_2$, $TiO_2$, $Mn_2O_3$, MgO, ZnS or the like or a mixture thereof is able to be used.

The solid electrolyte film 50, the cathode active material film 40, the anode potential formation layer 64, the cathode-side current collector film 30, the anode-side current collector 70, and the inorganic insulating film 20 described above are able to be respectively formed by a dry process such as sputtering method, electron beam evaporation method, and heat evaporation method.

As the organic insulating substrate 10, a polycarbonate (PC) resin substrate, a fluorine resin substrate, a polyethylene terephthalate (PET) substrate, a polybutylene terephthalate (PBT) substrate, a polyimide (PI) substrate, a polyamide (PA) substrate, a polysulfone (PSF) substrate, a polyether sulfone (PES) substrate, a polyphenylene sulfide (PPS) substrate, a polyether ether ketone (PEEK) substrate or the like is able to be used. Though a material of the substrate is not particularly limited, a substrate having low moisture absorption characteristics and moisture resistance is more preferable.

As a material composing the overall protective film 80, any material having low moisture absorption characteristics and moisture resistance may be used. As such a material, an acryl ultraviolet curing resin, an epoxy ultraviolet curing resin or the like is able to be used. The overall protective film is able to be formed by evaporating a parylene resin film.

EXAMPLES AND COMPARATIVE EXAMPLES

Structures in Examples and Comparative Examples

FIG. 6 is a diagram explaining structures of respective layers of solid state lithium ion batteries in Examples and Comparative examples of the present invention.

Example 1

A solid state lithium ion battery having the structure illustrated in FIG. 1 was formed. Taking mass productivity and cost into consideration, a polycarbonate (PC) substrate having a thickness of 1.1 mm was used as the substrate 10. Alternately, a substrate made of a glass material, acryl or the like is able to be used. Any substrate which has no electric conductivity and in which its surface is sufficiently flat according to the film thickness of the formed battery may be used. As the inorganic insulating film 20, a $Si_3N_4$ film having a thickness of 200 nm was formed on the whole surface of the substrate 10.

As illustrated in FIG. 1, the laminated body was formed by sequentially forming the cathode-side current collector film 30, the cathode active material film 40, the solid electrolyte film 50, the anode potential formation layer 64, and the anode-side current collector film 70 on the inorganic insulating film 20 with the use of a metal mask. However, the lamination order may be opposite of the foregoing order, that is, the laminated body is able to be formed by sequentially layering the anode-side current collector film 70, the anode potential formation layer 64, the solid electrolyte film 50, the cathode active material film 40, and the cathode-side current collector film 30 on the inorganic insulating film 20.

As the metal mask, a stainless mask having a size of 500 μm was used. Alternately, a pattern is able to be formed by using lithography technology. In any case, the all films composing the foregoing laminated body are formed on the inorganic insulating film.

As the cathode-side current collector film 30 and the anode-side current collector film 70, Ti was used, and the film thickness thereof was 100 nm or 200 nm. For the cathode-side current collector film 30 and the anode-side current collector film 70, other material is able to be similarly used as long as such a material has electric conductivity and superior durability. Specifically, a metal material containing Au, Pt, Cu or the like or an alloy thereof is used. The metal material may contain an additive in order to improve durability and electric conductivity.

As the cathode active material film 40, $LiMn_2O_4$ was used, and the film thickness thereof was 125 nm. The film formation method of the cathode active material film 40 was sputtering method. Since the cathode active material film 40 was formed under the condition that temperature of the substrate 10 was room temperature and post annealing was not performed, the cathode active material film 40 was in amorphous state. With the use of XRD (Shimazu XRD-6000), it was found that the peak of $LiMn_2O_4$ was not shown, and crystallization was not shown.

In addition, in observation by using TEM, it was found that there was possibility that micro-crystallization was made. Example 1 did not depend on the state of the cathode active material film 40. It is needless to say that even if crystallization is made, characteristics similar to or more than those of Example 1 are able to be obtained, and effect of the present invention are able to be obtained similarly in the case of using other material. The cathode active material film 40 is able to be formed from other material. A well-known material such as $LiCoO_2$, $LiFePO_4$, and $LiNiO_2$ is able to be used.

For the film thickness of the cathode active material film 40, there is no specific point to be described, except that a larger film thickness provided a higher battery capacity. The capacity in Example 1 was about 7 μAh/cm² (refer to after-mentioned FIG. 7) which was a sufficient amount to provide effect of the present invention. According to the application and the purpose, the film thickness of the cathode active material film 40 is able to be adjusted.

It is needless to say that in Example 1, if the cathode active material film 40 is annealed, more favorable characteristics are obtained. As the solid electrolyte film 50, $Li_3PO_4N_x$ was used. Since the solid electrolyte film 50 was formed under the condition that temperature of the substrate 10 in sputtering was room temperature and post annealing was not performed, the formed solid electrolyte film 50 was in amorphous state. For composition x of nitrogen in the formed solid electrolyte film 50, the accurate numerical value is unknown due to reactive sputtering of nitrogen in sputtering gas. However, the composition x of nitrogen in the formed solid electrolyte film 50 may be a value similar to that of Non-patent document 1.

In Example 1, it is apparent that similar effect is able to be obtained even if other solid electrolyte film material is used. A known material such as $LiBO_2N_x$, $Li_4SiO_4$—$Li_3PO_4$, and $Li_4SiO_4$—$Li_3VO_4$ is able to be used.

Regarding the film thickness of the solid electrolyte film 50, it is necessary to obtain sufficient insulation properties. Thus, in the case where the film thickness of the solid electrolyte film 50 is excessively small, there is a possibility that short circuit is generated in the initial stage or in the course of charge and discharge. Therefore, for example, the film thickness of the solid electrolyte film 50 is preferably 50 nm or more. However, the film thickness of the solid electrolyte film 50 depends not only on the film thickness and the film quality of the cathode, but also on the substrate, the current collector material, the film formation method, and the charge and discharge rate. Thus, in terms of durability, in some cases, the film thickness of the solid electrolyte film 50 is preferably larger than the foregoing value.

On the contrary, in the case where the film thickness of the solid electrolyte film 50 is excessively large, for example, in the case where the film thickness of the solid electrolyte film 50 is 500 nm or more, since the ionic conductivity of the solid electrolyte film 50 is often lower than that of a liquid electrolyte, a problem occurs in charge and discharge. Further, in the case where the solid electrolyte film 50 is formed by sputtering, if the film thickness is excessively large, sputtering time becomes longer, takt time becomes longer, and a sputtering chamber should be multi-channelized. It leads to large business investment, which is not preferable.

Thus, the film thickness of the solid electrolyte film 50 should be set to an appropriate value by taking the foregoing conditions into consideration. However, the film thickness itself is not related to the effect of the present invention. In this case, the film thickness of the solid electrolyte film 50 was 145 nm.

The use of a material capable of composing the cathode active material film 40 or a material having potential close to that of the cathode active material for the anode potential formation layer 64 is a characteristic of the present invention. In this case, Example using $LiMn_2O_4$ that is the same material as that of the cathode active material film 40 is exemplified. The film thickness of the anode potential formation layer 64 was 6 nm.

As the anode-side current collector film 70 and the cathode-side current collector film 30, Ti was used, and the film thickness was 200 nm.

Finally, the overall protective film 80 was formed by using an ultraviolet curing resin. The overall protective film 80 functions as a protective film to moisture intrusion from the opposite side face of the substrate 10. That is, it was confirmed that intrusion of harmful matter such as water and oxygen was prevented and electric short circuit was less likely to be generated by appropriately covering the surface of the battery with the overall protective film 80 according to expansion and shrinkage due to charge and discharge. Further, for a sample in which the overall protective film 80 was not formed, many foam-like defects 100 μm or more in size were generated on the surface within about 1 week, short circuit was generated, and function as a battery was disabled. Thus, the overall protective film 80 functioned as a protective film. Further, concurrently, the overall protective film 80 protected from a scratch in handling.

As the ultraviolet curing resin used for forming the overall protective film 80, an ultraviolet curing resin under model number SK3200 made by Sony Chemical & Information Device Corporation was used. For example, other ultraviolet curing resin under model number SK5110 or the like made by Sony Chemical & Information Device Corporation is also able to be used, and similar effect is expectable. As a material used for forming the overall protective film, in particular, a material having high water resistant protective effect is preferable.

In addition, part of the ultraviolet curing resin covering the cathode-side current collector 30 and the anode-side current collector 70 was peeled, only the Ti metal face of the current collectors 30 and 70 was the exposed section, and such a section was used as an electrode connection terminal to avoid influence on battery durability.

In summary, the battery film structure was the polycarbonate substrate/$Si_3N_4$ (200 nm)/Ti (100 nm)/$LiMn_2O_4$ (125 nm)/$Li_3PO_4N$, (145 nm)/$LiMn_2O_4$ (6 nm)/Ti (200 nm)/ultraviolet curing resin (20 μm) (refer to FIG. 6(A)).

In this case, the foregoing respective films composing the battery were formed by sputtering. However, a method such as evaporation, plating, and spray coating is able to be used as long as a battery thin film having similar film quality is able to be formed.

A description will be hereinafter given of the film formation by sputtering method in detail.

For forming the Ti film, the $LiMn_2O_4$ film, and the $Li_3PO_4N$, film, SMO-01 special model made by ULVAC Inc. was used. The target size was 4 inches in diameter. The sputtering conditions of the respective layers were as follows.

(1) Forma the Ti film
Sputtering gas: Ar 70 sccm, 0.45 Pa
Sputtering power: 1000 W (DC)
(2) Formation of the $LiMn_2O_4$ film
Sputtering gas: (Ar 80%+$O_2$ 20% mixed gas) 20 sccm, 0.20 Pa
Sputtering power: 300 W (RF)
(3) Formation of the $Li_3PO_4N$, film
Target composition: $Li_3PO_4$
Sputtering gas: Ar 20 sccm+$N_2$ 20 sccm, 0.26 Pa
Sputtering power: 300 W (RF)

In addition, sputtering time was adjusted so that a desired film thickness was obtained.

Charge and discharge curve was measured by using Keithley2400, and the charge and discharge rate was 1 C in all cases (current value corresponding to completing charge and discharge in 1 hour). The charge and discharge current value in Example 1 was 8 μA.

Figure 7:
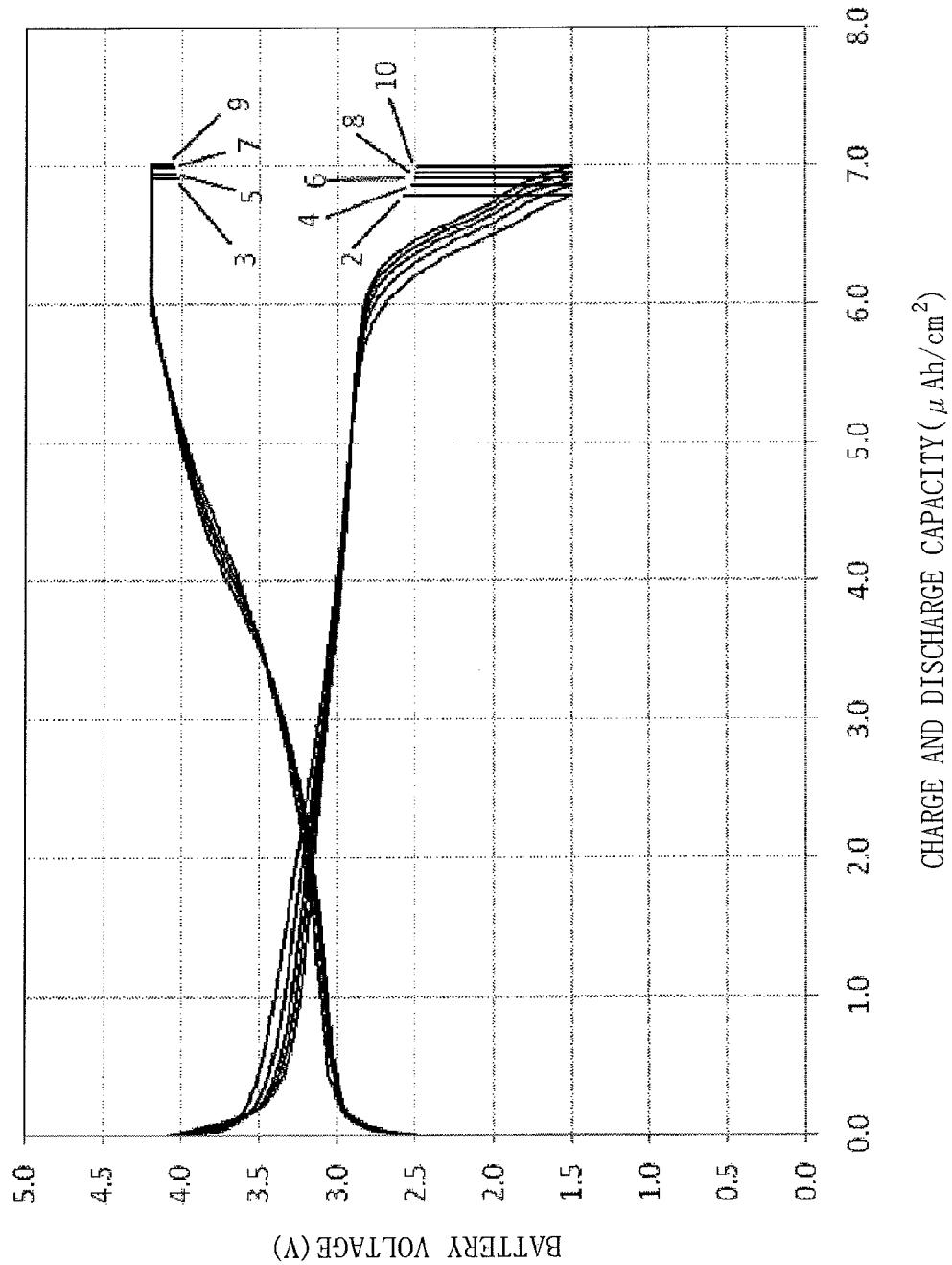
FIG. 7 is a diagram illustrating charge and discharge curves of the solid state lithium ion battery in an example of the present invention.

FIG. 7 is a diagram illustrating charge and discharge curves of the solid state lithium ion battery in Example 1 of the present invention. The horizontal axis indicates a charge and discharge capacity (μAh/cm$^2$), and the vertical axis indicates a battery voltage (V).

In FIG. 7, even numbers n=2, 4, and so on affixed to charge and discharge curves indicate discharge, and odd numbers n=3, 5, and so on indicate charge. For example, n=2 indicates the first discharge curve after the initial charge, and n=3 indicates the charge curve after the first discharge. That is, even number n=K indicates k=(K/2)th discharge after the initial charge (n=1) where k is 1, 2 and so on, and odd number n=M indicates m=((M+1)/2)th charge curve where m is 2, 3 and so on.

The results illustrated in FIG. 7 show that charge and discharge in repeated charge and discharge were very favorably performed. Since the material composing the cathode active material film was not crystallized, obtained battery voltages were slightly lower than in general Li ion batteries as a whole, while drive was enabled in the range of 2.5 V or more. Further, at the same time as the end of discharge, the battery voltages were drastically decreased, which was ideal behavior as a battery. It is thought that such behavior is effect of the anode potential formation layer 64.

That is, it was shown that in the battery in which a Li precipitation layer or the Li-excessive layer was formed, at the same time as discharge of all Li, potential was ideally decreased down to 0 without being influenced by potential change according to the state of the anode-side current collector surface.

Figure 8:
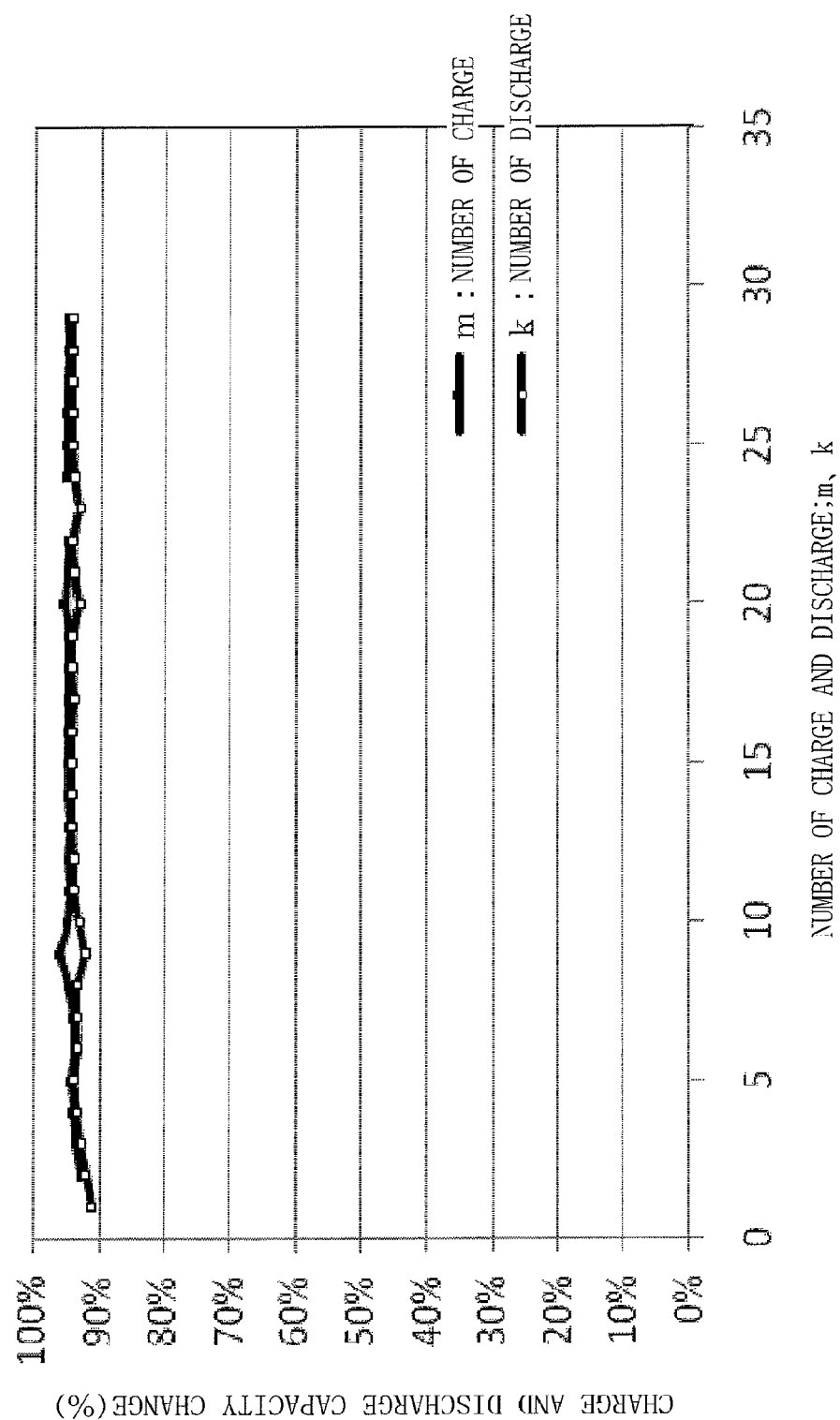
FIG. 8 is a diagram illustrating charge and discharge cycle characteristics of the solid state lithium ion battery in the example of the present invention.

FIG. 8 is a diagram illustrating charge and discharge cycle characteristics of the solid state lithium ion battery in Example 1 of the present invention.

In FIG. 8, horizontal axes k and m indicate k th (k=1, 2 and so on) discharge corresponding to an even number n affixed to the charge and discharge curves illustrated in FIG. 7 and m th (m=1, 2, 3 and so on) charge corresponding to an odd number n. The vertical axis indicates a relative value (%) of a charge and discharge capacity to a capacity (100%) in the charge and discharge capacity change (initial charge (n=1)).

FIG. 8 illustrates experiment result of charge and discharge repeated about 30 cycles. It is shown that deterioration of battery performance was significantly little in the experiment range, and favorable repeated charge and discharge characteristics were obtained. Such favorable characteristics without deterioration or in which a capacity is slightly increased at the time of initial charge and discharge were realized by the structure of the present invention.

That is, it was shown that the thin film Li battery having the structure according to Example 1 had both favorable discharge voltage characteristics and favorable repeated charge and discharge characteristics.

As the anode potential formation layer 64, for a material capable of composing the cathode active material film 40 or a material having potential close to the standard electrode potential of the cathode active material, $LiCoO_2$, $LiFePO_4$, $LiNiO_2$ and the like are able to be used. The range thereof is as follows. From the result of Example 1, it was shown that driving is enabled at 2.5 V or more. However, as a battery, a range of 0.5 V or more is preferable.

In the case where a material different from that of the cathode active material film 40 is used as the anode potential formation layer 64, and the standard electrode potential is different from the standard electrode potential of the cathode active material film 40, if the standard electrode potential is low, 2V or more after discharge, the battery is driven at 0.5 V or less. Further, in the case where the standard electrode potential is high, 2V or more, the battery voltage exceeds 4.5 V. However, even if a solid electrolyte is used, short circuit is easily generated, which is not preferable. Thus, as a material of the anode potential formation layer 64, it is preferable that difference between the standard electrode potential and the standard electrode potential of the cathode active material be 2 V or less.

Comparative Example 1

Result in the case of a battery having the existing structure using an anode active material will be described as a comparative example. An example using ITO having a film thickness of 20 nm as the anode active material will be described here.

The film structure of the fabricated battery was the polycarbonate substrate/$Si_3N_4$ (200 nm)/Ti (100 nm)/$LiMn_2O_4$ (125 nm)/$Li_3PO_4N_x$ (145 nm)/ITO (20 nm)/Ti (200 nm)/ultraviolet curing resin (20 μm) (refer to FIG. 6(B)).

In forming the ITO, C-3103 made by ANELVA Corporation was used. The target size was 6 inches in diameter. The sputtering conditions were as follows.

Target composition: ITO ($In_2O$ 90 wt. %+$SnO_2$ 10 wt. %)
Sputtering gas: Ar 120 sccm+(Ar 80%+$O_2$ 20% mixed gas) 30 sccm, 0.10 Pa
Sputtering power: 1000 W (DC)

In addition, other films composing the battery were formed in the same manner as that of Example 1, and measurement conditions of battery characteristics were similar to those of Example 1.

Figure 9:
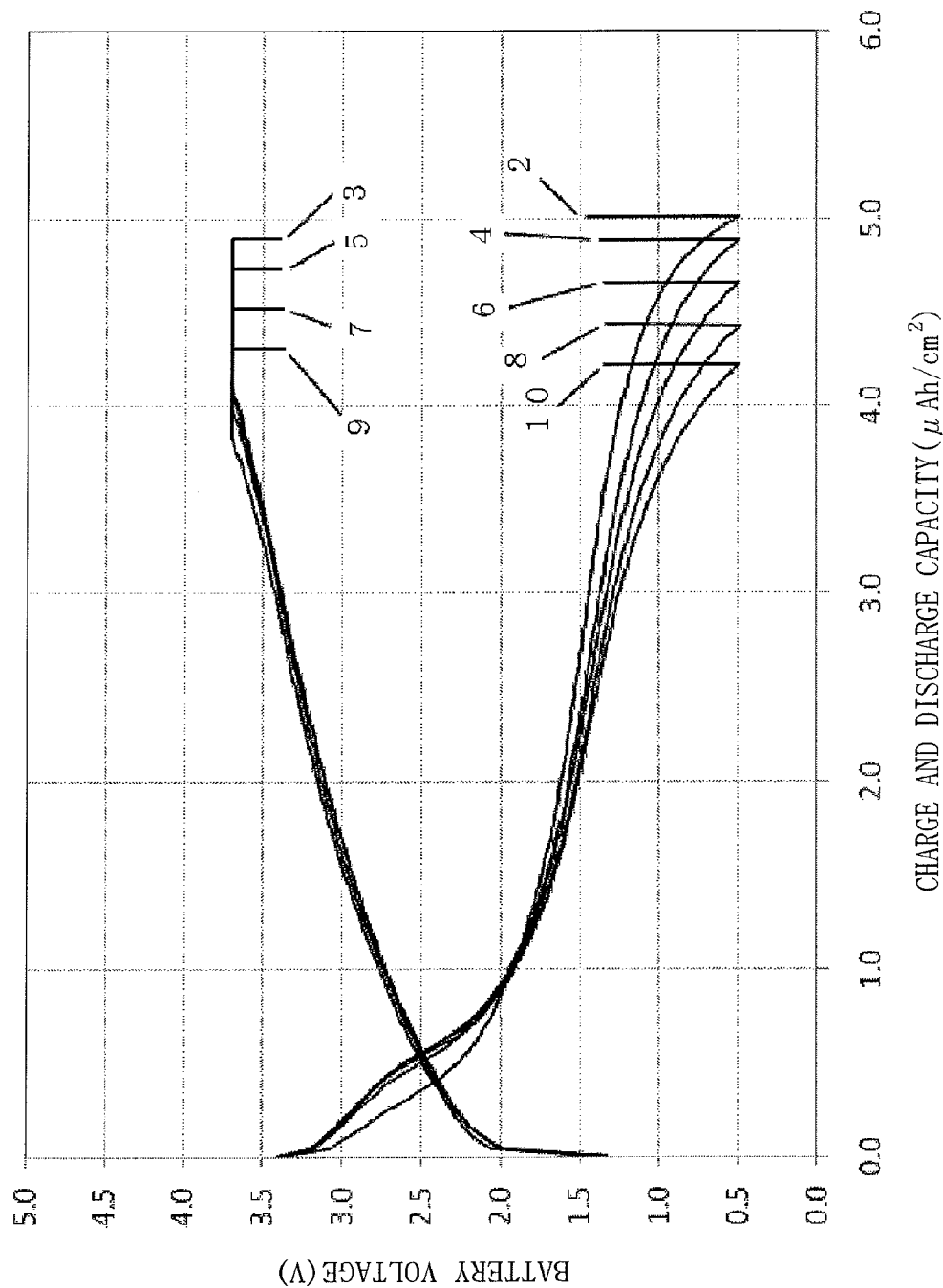
FIG. 9 is a diagram illustrating charge and discharge curves of the solid state lithium ion battery in an example of the present invention.

FIG. 9 is a diagram illustrating charge and discharge curves of the solid state lithium ion battery in Comparative example 1 of the present invention. The horizontal axis and the vertical axis indicate the same as those illustrated in FIG. 7. Meanings indicated by even numbers and odd numbers n affixed to the charge and discharge curves are the same as those of FIG. 7.

Figure 10:
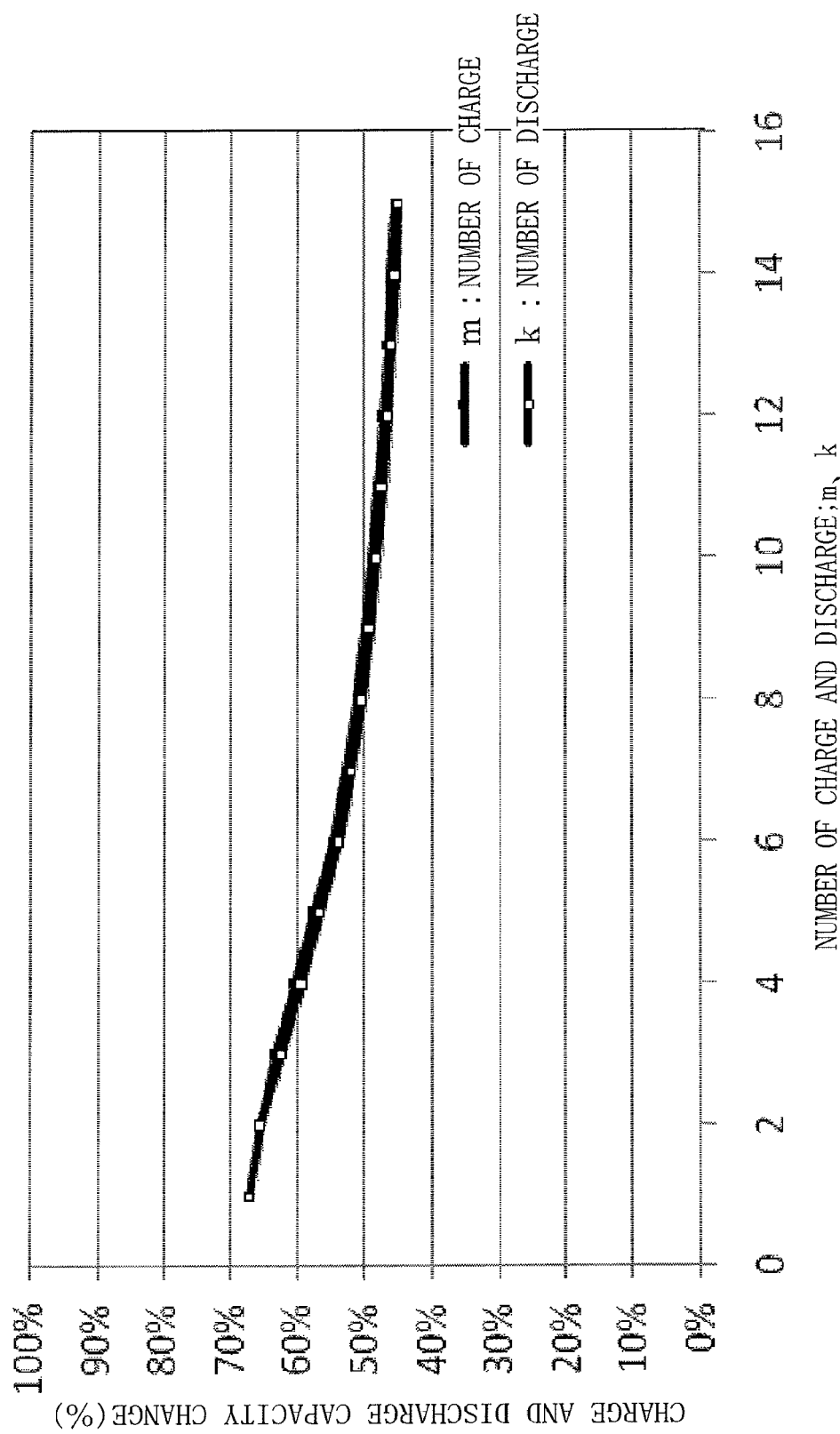
FIG. 10 is a diagram illustrating charge and discharge cycle characteristics of the solid state lithium ion battery in a comparative example of the present invention.

FIG. 10 is a diagram illustrating charge and discharge cycle characteristics of the solid state lithium ion battery in Comparative example 1 of the present invention. In addition, the horizontal axis and the vertical axis indicate the same as those illustrated in FIG. 8.

As illustrated in FIG. 9, the battery voltage was drastically decreased immediately after discharge start, and battery voltage drop moderately proceeded until discharge completion. Thus, it was found that a sufficient capacity (close to 80% of the initial discharge capacity) was not able to be obtained unless the battery voltage was decreased down to 0.5 V.

Further, as illustrated in FIG. 10, the repeated charge and discharge characteristics were not favorable compared to the repeated charge and discharge characteristics of the battery according to Example 1 illustrated in FIG. 8. The battery capacity was lowered down to less than 60% within 8 time repeated charge and discharge.

That is, as evidenced by comparison between Example 1 and Comparative example 1, it was found that in the existing battery structure of Comparative example 1, the thin film battery formed from the sputtering thin films was not able to obtain favorable characteristics. It was also found that it was effective to provide the anode potential formation layer 64 according to the present invention instead of the anode active material.

From comparison between FIG. 7 and FIG. 9, it was evident that the battery capacity and the output voltage were largely improved by providing the anode potential formation layer 64. Further, from comparison between FIG. 8 and FIG. 10, it was evident that durability to repeated charge and discharge was largely improved and lowering rate of the battery capacity was significantly small by providing the anode potential formation layer 64.

Example 2

A description will be given of an example that the film thickness of the anode potential formation layer 64 was 13 nm. Other films composing the battery were formed in the same manner as that of Example 1, and measurement conditions of battery characteristics were similar to those of Example 1. The film structure of the battery was the polycarbonate substrate/$Si_3N_4$ (200 nm)/Ti (100 nm)/$LiMn_2O_4$ (125 nm)/$Li_3PO_4N_x$ (145 nm)/$LiMn_2O_4$ (13 nm)/Ti (200 nm)/ultraviolet curing resin (20 μm) (refer to FIG. 6(A)).

Figure 11:
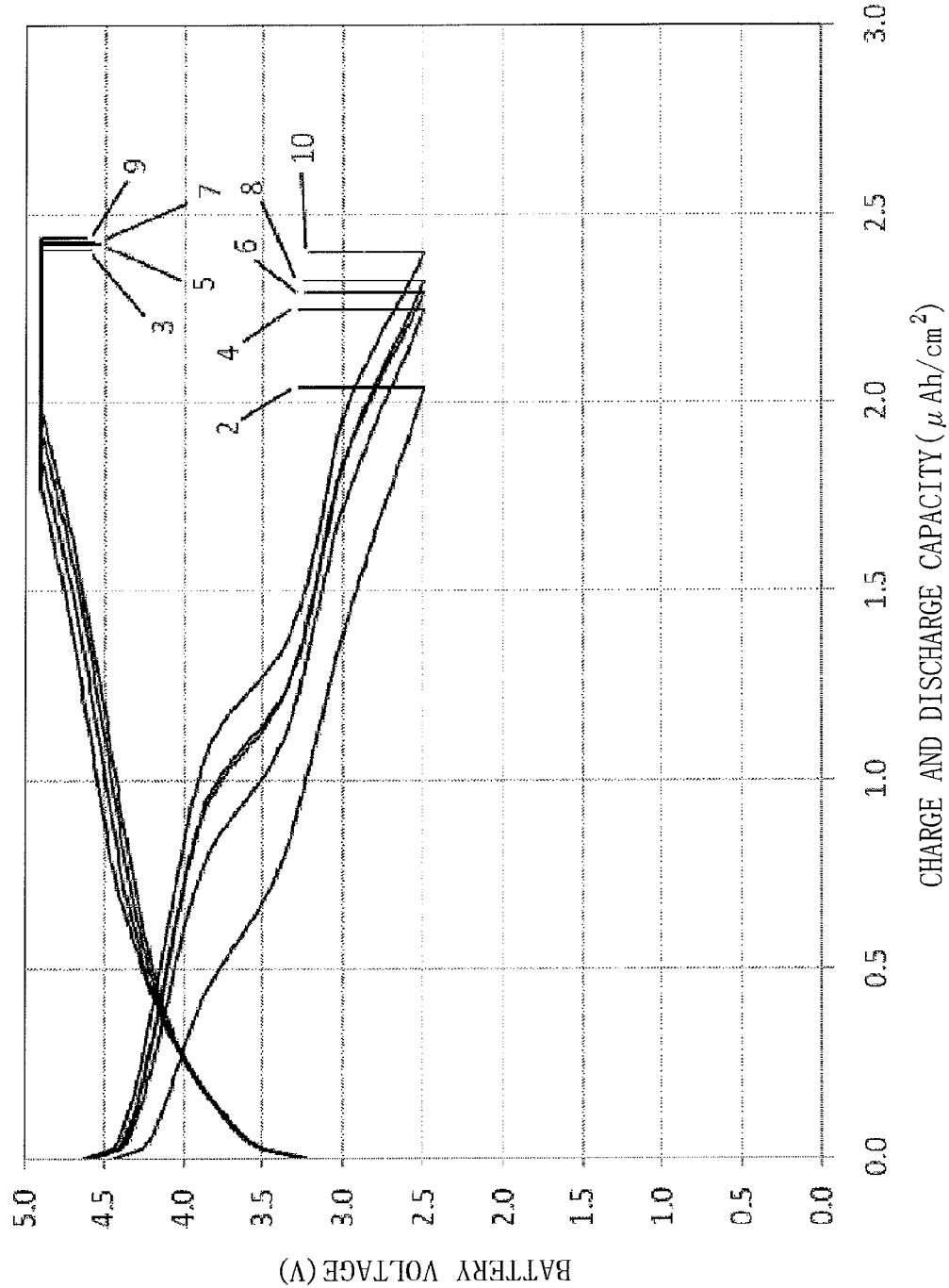
FIG. 11 is a diagram illustrating charge and discharge curves of the solid state lithium ion battery in an example of the present invention.

FIG. 11 is a diagram illustrating charge and discharge curves of the solid state lithium ion battery in Example 2 of the present invention. The horizontal axis and the vertical axis indicate the same as those illustrated in FIG. 7. Meanings indicated by even numbers and odd numbers n affixed to the charge and discharge curves are the same as those of FIG. 7.

As illustrated in FIG. 11, the drive voltage was retained 2.5 V or more. For the repeated charge and discharge characteristics, the charge and discharge capacity was increased along with the number of charge and discharge, which was favorable. However, the battery capacity was significantly low, which was about 30% of the capacity expected based on the theoretical capacity of the cathode active material (after-mentioned usage efficiency). The battery capacity was low for the following reason. That is, Li was excessively inserted in the anode potential formation layer 64, and the inserted Li was not returned to the cathode active material film 40 at the time of discharge.

In the film quality of the anode potential formation layer 64 by the film formation method of Example 2 (film formation method without post annealing for sputtering thin films formed at room temperature), in the case where the film thickness exceeded 13 nm, the capacity was further lowered down to about 30% or less of the capacity expected based on the theoretical capacity of the cathode active material, and battery performance was lowered. Considering practicality, the battery capacity is desirably about 30% or more of the capacity expected based on the theoretical capacity of the cathode active material, and the film thickness of the anode potential formation layer 64 is preferably 13 nm or less.

Example 3

A description will be given of an example that the film thickness of the anode potential formation layer 64 was 10 nm. Other films composing the battery were formed in the same manner as that of Example 1, and measurement conditions of battery characteristics were similar to those of Example 1. The film structure of the battery was the polycarbonate substrate/$Si_3N_4$ (200 nm)/Ti (100 nm)/$LiMn_2O_4$ (125 nm)/$Li_3PO_4N_x$ (145 nm)/$LiMn_2O_4$ (10 nm)/Ti (200 nm)/ultraviolet curing resin (20 μm) (refer to FIG. 6(A)).

Figure 12:
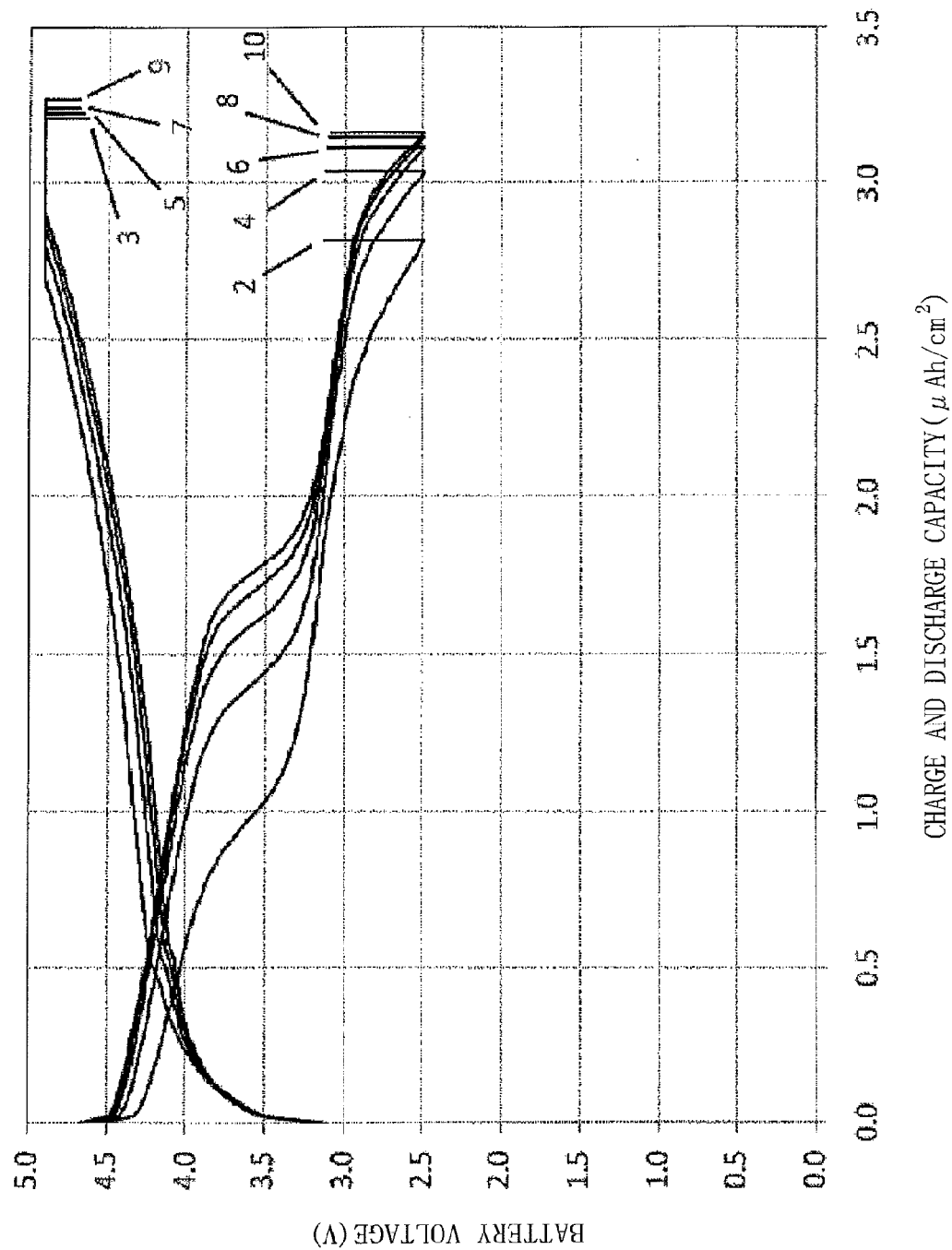
FIG. 12 is a diagram illustrating charge and discharge curves of the solid state lithium ion battery in an example of the present invention.

FIG. 12 is a diagram illustrating charge and discharge curves of the solid state lithium ion battery in Example 3 of the present invention. The horizontal axis and the vertical axis indicate the same as those illustrated in FIG. 7. Meanings indicated by even numbers and odd numbers n affixed to the charge and discharge curves are the same as those of FIG. 7.

As illustrated in FIG. 12, the drive voltage was retained 2.5 V or more. For the repeated charge and discharge characteristics, the charge and discharge capacity was increased along with the number of charge and discharge, which was favorable. However, the charge and discharge capacity value was larger than that of Example 2 (refer to FIG. 11). Thus, the film thickness of the anode potential formation layer 64 is more preferably 10 nm or less.

[Relation Between a Voltage and a Thickness of the Anode Potential Formation Layer of the Solid State Lithium Ion Battery]

As the film thickness of the anode potential formation layer is increased, impedance is increased and the charge and discharge capacity is lowered. Thus, in the case where $LiMn_2O_4$ is used, the film thickness of the anode potential formation layer is preferably 10 nm or less, and is more preferably 5 nm or less. As the film thickness is thinner, the charge and discharge capacity is improved. Meanwhile, in the case where the film thickness is 5 nm, film smoothness is lowered, resulting in lowered durability and lowered yield. Accordingly, in terms of durability and yield, the film thickness of the anode potential formation layer is preferably large.

Figure 13:
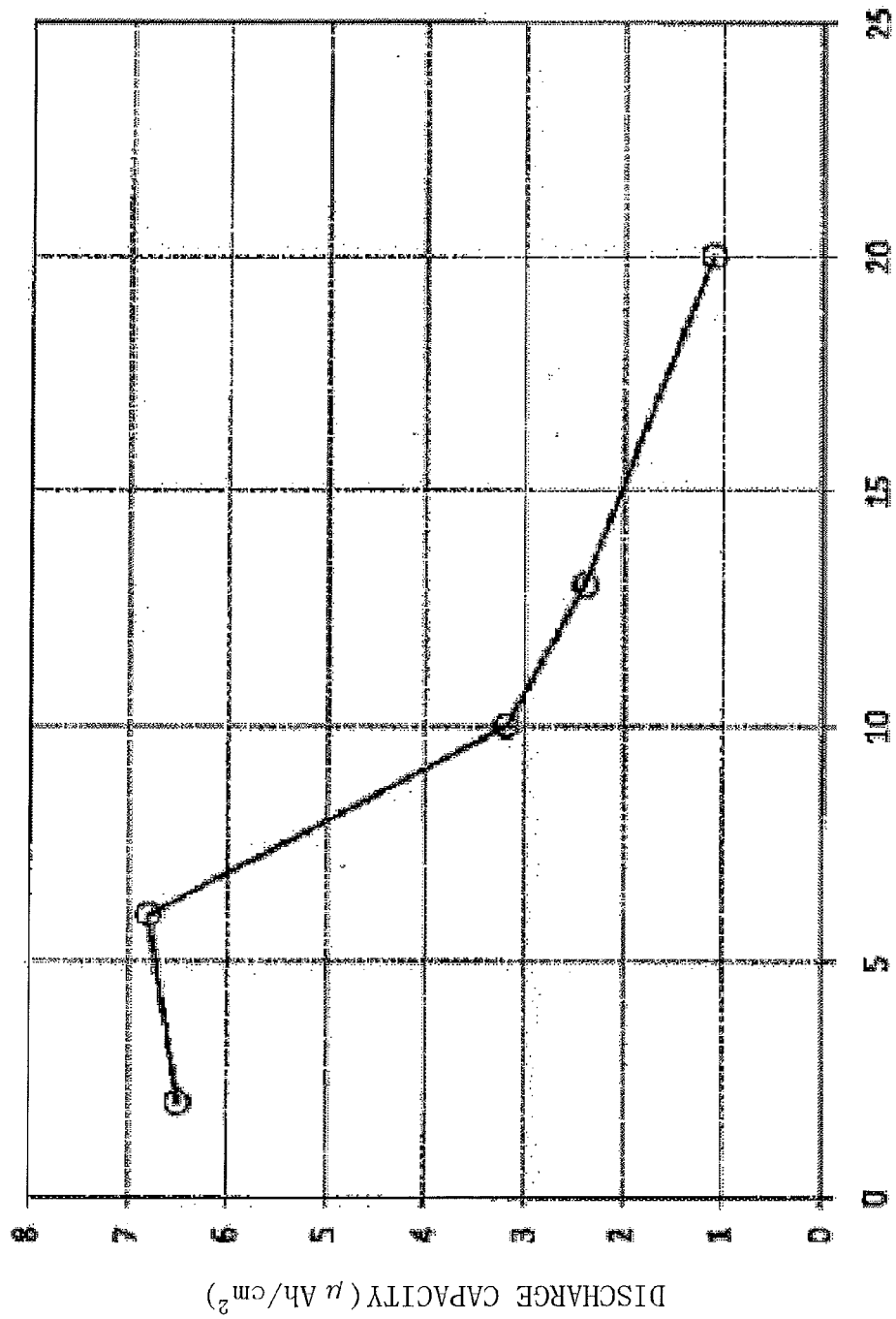
FIG. 13 is a diagram explaining relation between a discharge capacity and a thickness of anode potential formation layers of the solid state lithium ion batteries in the examples of the present invention.

FIG. 13 is a diagram explaining relation between a discharge capacity and a thickness of the anode potential formation layer of the solid state lithium ion batteries in the examples of the present invention. The horizontal axis indicates a thickness of the anode potential formation layer composed of $LiMn_2O_4$, and the vertical axis indicates a discharge capacity (μAh/cm²).

FIG. 13 indicates a capacity (battery capacity) usable at the time when the battery voltage reached 2.5V in the charge curve at the time of 10th discharge. From the result illustrated in FIG. 13, where a capacity when the battery capacity became the maximum, that is, when the film thickness of the anode potential formation layer was 6 nm (referred to as the maximum capacity) was 100%, battery capacities when the film thickness of the anode potential formation layer was 2 nm, 3 nm, 10 nm, 13 nm, and 20 nm (referred to as the relative battery capacity) were respectively 95.6%, 97.1%, 47.1%, 35.3%, and 16.2% as illustrated in FIG. 20 described below.

Thus, in the case where $LiMn_2O_4$ was used as a material composing the anode potential formation layer, if the thickness of the anode potential formation layer was 2 nm or more and 20 nm or less, the capacity was able to be 15% or more of the maximum capacity. Further, if the thickness of the anode potential formation layer was 2 nm or more and 13 nm or less, the capacity was able to be 35% or more of the maximum capacity. If the thickness of the anode potential formation layer was 3 nm or more and 10 nm or less, the capacity was able to be 45% or more of the maximum capacity. If the thickness of the anode potential formation layer was 3 nm or more and 6 nm or less, the capacity was able to be approximately the maximum capacity.

As illustrated in FIG. 13, the discharge capacity of the solid state lithium ion battery was changed according to the film thickness of the anode potential formation layer. In the case where the film thickness of the anode potential formation layer was 2 nm, approximately the same charge and discharge characteristics as those in the case that the film thickness was 6 nm were shown, and the discharge capacity in the case that the film thickness was 2 nm was approximately the same as that in the case that the film thickness was 6 nm. As the film thickness of the anode potential formation layer became larger than 6 nm, the discharge capacity was lowered. After the film thickness exceeded 13 nm, the capacity was lowered less than about 30% of the discharge capacity expected based on the theoretical capacity of the cathode active material.

Figure 20:
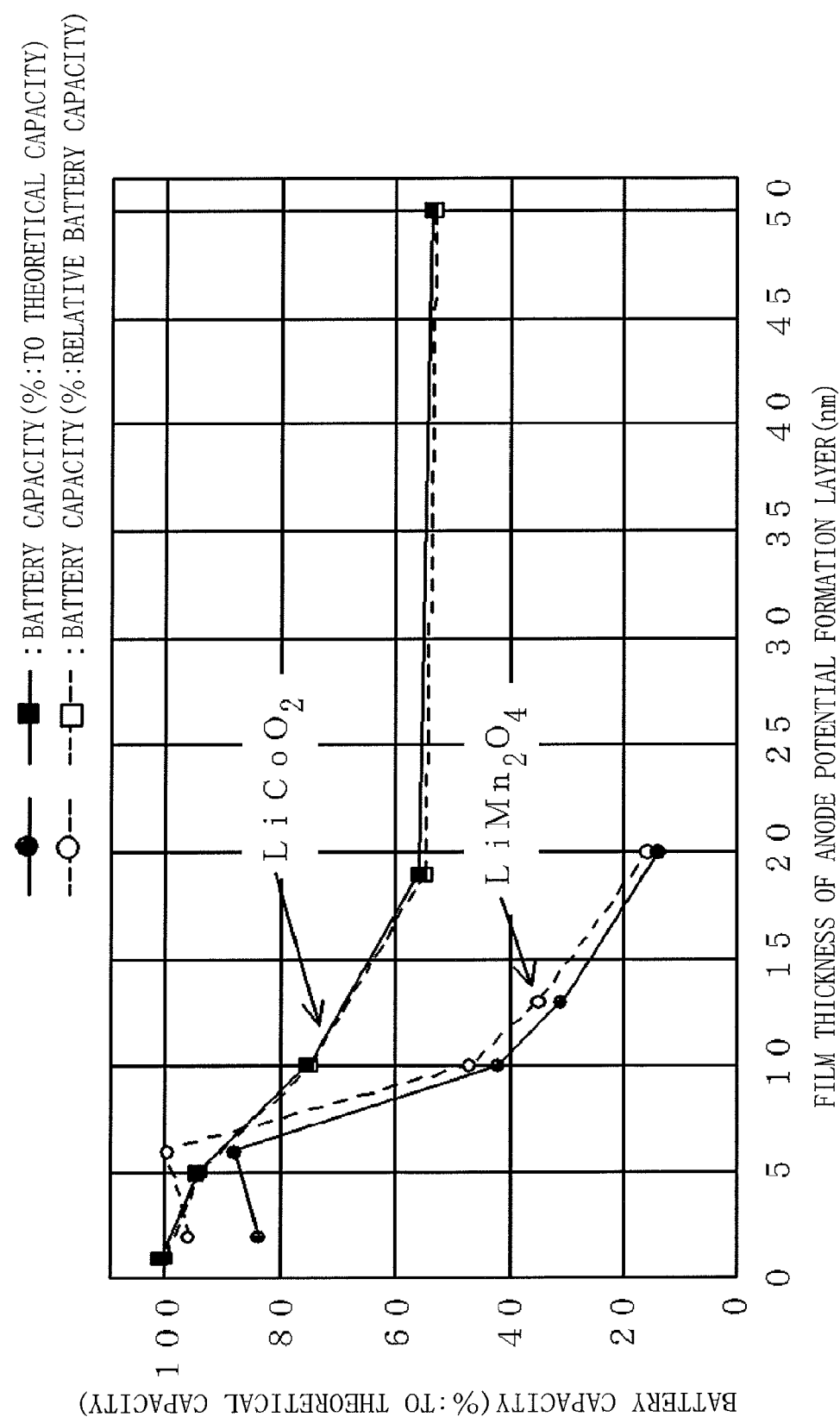
FIG. 20 is a diagram explaining relation between a battery capacity and a thickness of the anode potential formation layers of the solid state lithium ion batteries in the examples of the present invention.

In addition, where the density of $LiMn_2O_4$ was 4.2 g/cm³, in FIG. 13, battery discharge capacities when the film thicknesses of the anode potential formation layer were 2 nm, 6 nm, 10 nm, 13 nm, and 20 nm were respectively 83.7%, 87.5%, 41.2%, 30.9%, and 14.2% of the capacity expected based on the theoretical capacity of 7.77 μAh/cm² of the cathode active material as illustrated in FIG. 20 described below (usage efficiency described later).

Considering practicality, the battery capacity is desirably about 30% or more of the capacity expected based on the theoretical capacity of the cathode active material, and the film thickness of the anode potential formation layer 64 is preferably 2 nm or more and 13 nm or less. Further, in the case where a trial is made to form a stable film thickness of the anode potential formation layer 64 in battery mass production, if the film thickness of the anode potential formation layer 64 is less than 3 nm, stability of the film thickness is lowered and the film thickness easily varies. Thus, in order to form the anode potential formation layer 64 with a stable film thickness and to secure battery mass productivity, the film thickness of the anode potential formation layer 64 is desirably 3 nm or more.

In order to secure battery mass productivity and retain a larger battery capacity, the film thickness of the anode potential formation layer 64 is preferably 3 nm or more and 10 nm or less and is more preferably 3 nm or more and 6 nm or less.

It was evident that based on comparison between the charge and discharge curves illustrated in FIG. 7 and the charge and discharge curves illustrated in FIG. 11, in the case where the film thickness of the anode potential formation layer 64 was 10 nm or less (refer to FIG. 7), regarding voltage behavior at the time of repeated charge and discharge, the voltage was higher than that in the case that the film thickness of the anode potential formation layer was 13 nm (refer to FIG. 11), a range in which the battery was able to be used at in the vicinity of 3V was wider, and the capacity at the time of repeated charge and discharge was stable from the initial time.

it is to be noted that in FIG. 13, the position where the horizontal axis is "0" is a position in which the film thickness of the anode potential formation layer 64 is "0" and the anode potential formation layer 64 is not formed (it is needless to say that the anode active material film is not formed as well), which is a position at which Comparative example 2 described below should be plotted.

Comparative Example 2

A description will be given of a comparative example formed by a film formation method similar to that of Example 1 without using the anode potential formation layer 64. The film structure of the battery in Comparative example 2 was totally the same as that of Example 1, except that the anode potential formation layer 64 was not formed. The film structure of the battery in Comparative example 2 was the polycarbonate substrate/$Si_3N_4$ (200 nm)/Ti (100 nm)/$LiMn_2O_4$ (125 nm)/$Li_3PO_4N_x$ (145 nm)/Ti (200 nm)/ultraviolet curing resin (20 μm) (refer to FIG. 6(B)).

The film structure of the battery was a film structure of a battery simply without an anode active material film, and was basically similar to that of Non-patent document 2. Other films composing the battery were formed in the same manner as that of Example 1, and measurement conditions of battery characteristics were similar to those of Example 1.

Figure 14:
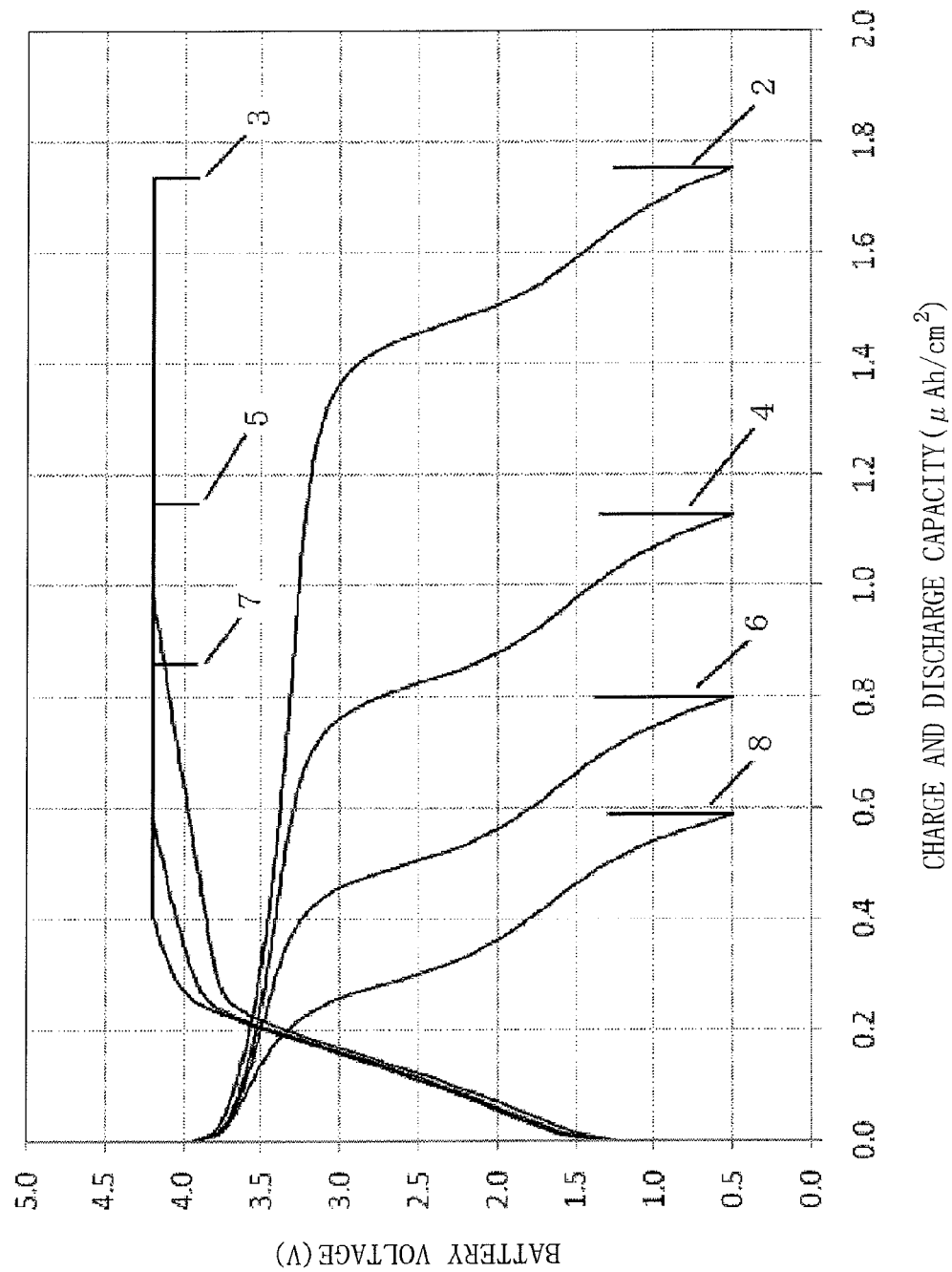
FIG. 14 is a diagram illustrating charge and discharge curves of the solid state lithium ion battery in a comparative example of the present invention.

FIG. 14 is a diagram illustrating charge and discharge curves of the solid state lithium ion battery in Comparative example 2 of the present invention. The horizontal axis and the vertical axis indicate the same as those illustrated in FIG. 7. Meanings indicated by even numbers and odd numbers n affixed to the charge and discharge curves are the same as those of FIG. 7.

Figure 15:
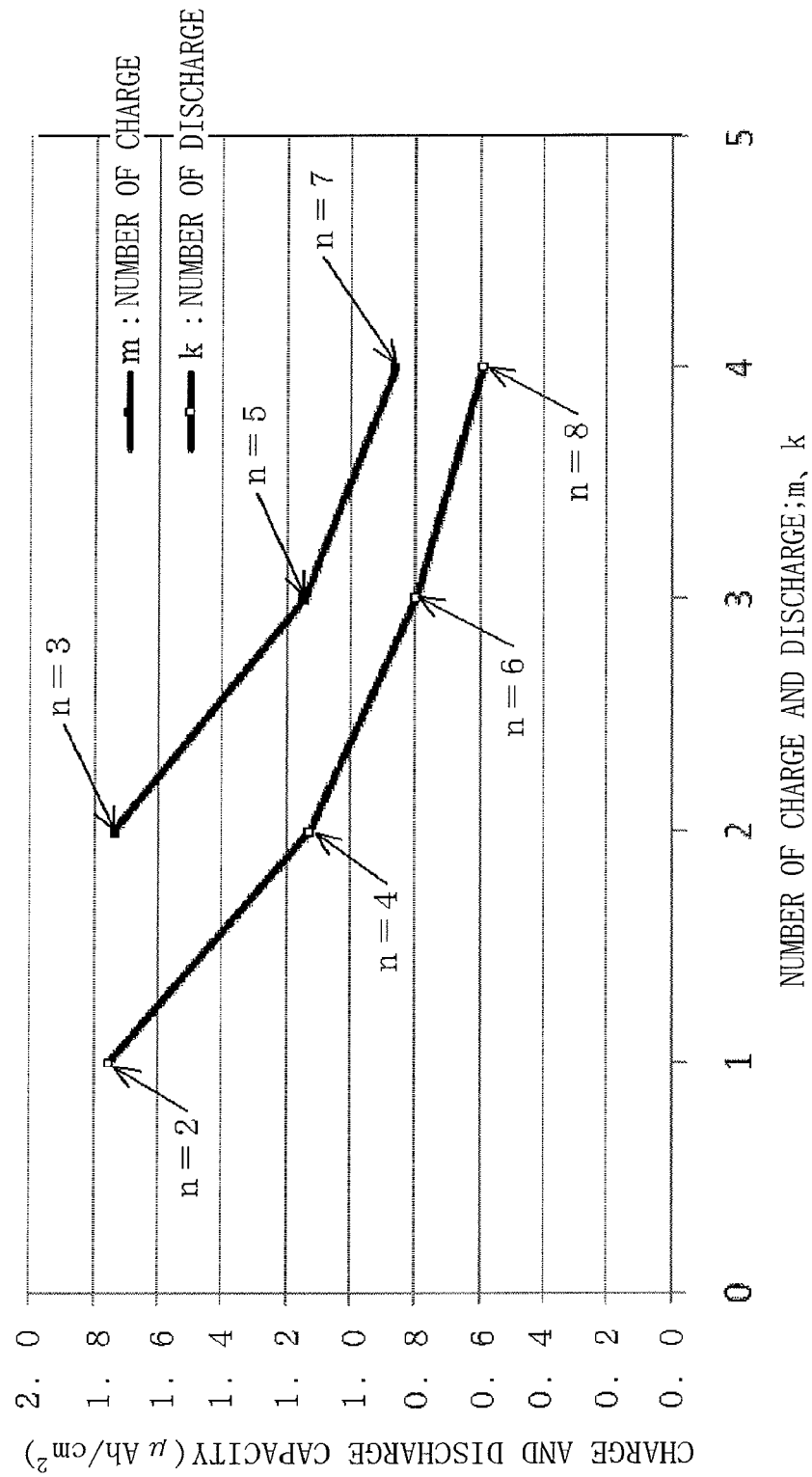
FIG. 15 is a diagram illustrating charge and discharge cycle characteristics of the solid state lithium ion battery in the comparative example of the present invention.

FIG. 15 is a diagram illustrating charge and discharge cycle characteristics of the solid state lithium ion battery in Comparative example 2 of the present invention. The horizontal axis in FIG. 15 is the same as that illustrated in FIG. 8, and the vertical axis in FIG. 15 indicates the charge and discharge capacity (μAh/$cm^2$) illustrated in FIG. 14.

Comparing to the charge and discharge curves in Example 1 illustrated in FIG. 7, it was evident that deterioration was significantly fast in the charge and discharge curves illustrated in FIG. 14. FIG. 14 and FIG. 15 illustrate up to 4th discharge. Within such a range, the battery capacity was drastically lowered (refer to FIG. 15). It is evident that such behavior was generated since the anode potential formation layer 64 was not formed between the Ti electrode (anode-side current collector film 70) and the solid state electrolyte film 50. From comparison between Example 1 and Comparative example 2, it was evident that the anode potential formation layer 64 of the present invention was significantly effective.

In addition, in the case where a metal material other than Ti was used as the anode-side current collector film 70, deterioration was similarly observed more or less for the following suspected reason. That is, in charging, Li was diffused in the metal film (anode-side current collector film 70), and the diffused Li was not returned to the previous state at the time of discharge. The anode potential formation layer 64 used in the present invention had conductivity, diffusion of Li to the anode-side current collector film 70 was kept to the minimum, and thereby battery characteristics were favorably retained. Further, the characteristics of the present invention are that since the film thickness of the anode potential formation layer 64 is small, the anode potential formation layer 64 itself does not function as an anode and contributes to formation of the Li-excessive layer.

The anode potential formation layer 64 is a layer provided for forming anode potential at the time of charge. Since the anode potential formation layer 64 inhibits Li diffusion to the anode-side current collector and protects the anode-side current collector, the anode potential formation layer 64 is also an anode-side current collector protective film.

In addition, in Comparative example 2, in forming the battery samples, 10 samples were concurrently provided with film forming. However, the charge and discharge curve illustrated in FIG. 9 was obtained in only one sample. Short circuit was generated at the time of initial charge in the other samples, resulting in defectives as a battery. In other words, in the case where batteries having the structure as Comparative example 2 were formed, yield was significantly low. Meanwhile, in batteries having the structure as in Example 1, yield was approximately 100%, resulting in high productivity and significantly high stability.

It is needless to plot the result of the battery of Comparative example 2 in the foregoing FIG. 13. The charge and discharge capacity of the battery of Comparative example 2 was 2 μAh/$cm^2$ or less as illustrated in FIG. 14 and FIG. 15, which was smaller than the charge and discharge capacity of the battery described in Example 2. The battery voltage of Comparative example 2 was also low.

In the foregoing Example 1, Example 2, and Example 3, the description has been given of the solid state lithium ion battery in which the anode potential formation layer and the cathode active material film are formed from $LiMnO_4$. Next, a description will be given of a solid state lithium ion battery in which the anode potential formation layer and the cathode active material film are formed from $LiCoO_2$.

The film thickness of the anode potential formation layer (anode-side current collector protective film) formed from $LiCoO_2$ is able to be increased up to 20 nm. A solid state lithium ion battery including the anode potential formation layer having a film thickness 2 nm or more and 20 nm or less has high durability and favorable charge and discharge characteristics.

Comparative Example 4

A description will be given of an example of a solid state lithium ion battery in which the anode potential formation layer and the cathode active material film were respectively formed from LiCoO$_2$. Respective films composing the battery were formed in the same manner as that of Example 1, and charge and discharge curves of the battery were measured in the same manner as that of Example 1.

In addition, the formation conditions of the LiCoO$_2$ film were as follows.

Target composition: LiCoO$_2$
Target size: 4 inches in diameter
Sputtering gas: (Ar 80%+O$_2$ 20% mixed gas) 20 sccm, 0.20 Pa
Sputtering power: 300 W (RF)
Sputtering time was adjusted so that a given film thickness was obtained.

The thin film batteries were formed by setting the film thickness of the cathode active material to 180 nm, setting the film thickness of the solid electrolyte film to 480 nm, and setting film thickness t of the anode potential formation layer to 5 nm, 10 nm, 20 nm, and 50 nm.

The film structure of the fabricated batteries was the polycarbonate substrate/Si$_3$N$_4$ (200 nm)/Ti (100 nm)/LiCoO$_2$ (125 nm)/Li$_3$PO$_4$N$_x$ (145 nm)/ LiCoO$_2$ (t nm)/Ti (200 nm)/ultraviolet curing resin (20 μm). t was 5 nm, 10 nm, 20 nm, and 50 nm.

Figure 16:
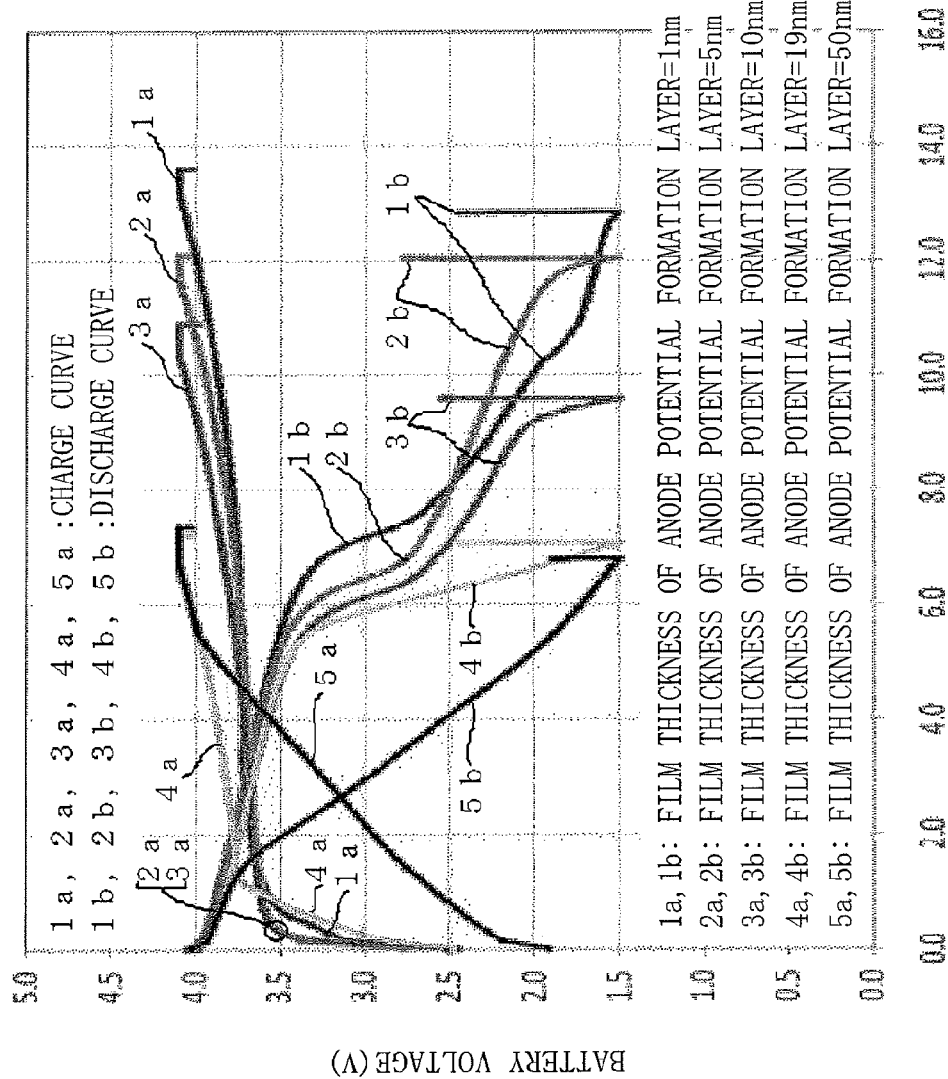
FIG. 16 is a diagram illustrating relation between charge and discharge characteristics and a film thickness of anode potential formation layers of solid state lithium ion batteries in an example of the present invention.

FIG. 16 is a diagram illustrating relation between charge and discharge characteristics and a film thickness of the anode potential formation layer of the solid state lithium ion batteries in Example 4 of the present invention. The horizontal axis indicates a charge and discharge capacity (μAh/cm$^2$), and the vertical axis indicates a battery voltage (V). Since Li was precipitated in the course of charge and discharge, the Li metal was an anode, and the battery voltage was potential based on the anode (Li metal).

In FIG. 16, curves 1a, 2a, 3a, 4a, and 5a respectively indicate a charge and discharge curve, and curves 1b, 2b, 3b, 4b, and 5b respectively indicate a discharge curve. The curves (1a and 1b), the curves (2a and 2b), the curves (3a and 3b), the curves (4a and 4b), and the curves (5a and 5b) respectively indicate a charge curve and a discharge curve measured with the use of batteries in which the film thicknesses of the anode potential formation layer were 1 nm, 5 nm, 10 nm, 19 nm, and 50 nm. In addition, the charge curves indicate 9th charge curve, and the discharge curves indicate 10th discharge curve.

As evidenced by FIG. 16, capacities (battery capacity) usable at the time when the battery voltage reached 1.5V at the time of discharge were respectively 12.8 μAh/cm$^2$, 12.0 μAh/cm$^2$, 9.6 μAh/cm$^2$, 7.1 μAh/cm$^2$, and 6.8 μAh/cm$^2$ in the batteries in which the film thicknesses of the anode potential formation layer were 1 nm, 5 nm, 10 nm, 19 nm, and 50 nm.

As illustrated in FIG. 16, as the film thickness of the anode potential formation layer was thinner, the battery capacity was increased. However, in the case where the film thickness of the anode potential formation layer was 1 nm, the charge and discharge curves as illustrated in FIG. 16 were able to be measured only in the first several cycles for the following possible reason. That is, since the film thickness of the anode potential formation layer was excessively small, protective function for the anode-side current collector film was not sufficient. In the case where the film thickness of the anode potential formation layer was 2 nm, charge and discharge characteristics were approximately the same as those in the case that the film thickness was 1 nm. However, stability of charge and discharge was improved, and yield that the initial charge and discharge was enabled was 90% or more.

Thus, the film thickness of the anode potential formation layer is preferably 2 nm or more. Further, in the case where the film thickness of the anode potential formation layer was 5 nm or more, capacity deterioration in repeated charge and discharge was hardly shown. Thus, the film thickness of the anode potential formation layer is preferably 5 nm or more.

As the film thickness of the anode potential formation layer became larger, behavior in the low voltage region of the discharge curves was slightly changed. The battery capacity was gradually decreased. In the battery in which the film thickness of the anode potential formation layer was 20 nm, the battery capacity was lowered down to about 7 μA/cm$^2$. Meanwhile, in the battery in which the film thickness of the anode potential formation layer was 20 nm or more, large difference was not shown in the battery capacity range in which the battery was able to be used in the region of 2.5 V or more.

Thus, in the case where the film thickness of the anode potential formation layer was 20 nm or less, the battery can be regarded as a battery in which lowering of the battery capacity is in the tolerable range, which is practical, in which the protective function to the anode-side current collector film is sufficient, in which the battery capacity lowering rate is small, and which has favorable characteristics.

Further, in the case where the film thickness of the anode potential formation layer exceeded 20 nm, behavior of electric potential higher than 2.5 V or more was deteriorated, and as indicated by the curves 5a and 5b of the battery in which the film thickness of the anode potential formation layer was 50 nm, the range in which the battery was able to be driven at a high voltage larger than 2.5 V was drastically lowered. Thus, it is not preferable that the film thickness of the anode potential formation layer exceed 20 nm.

Figure 17:
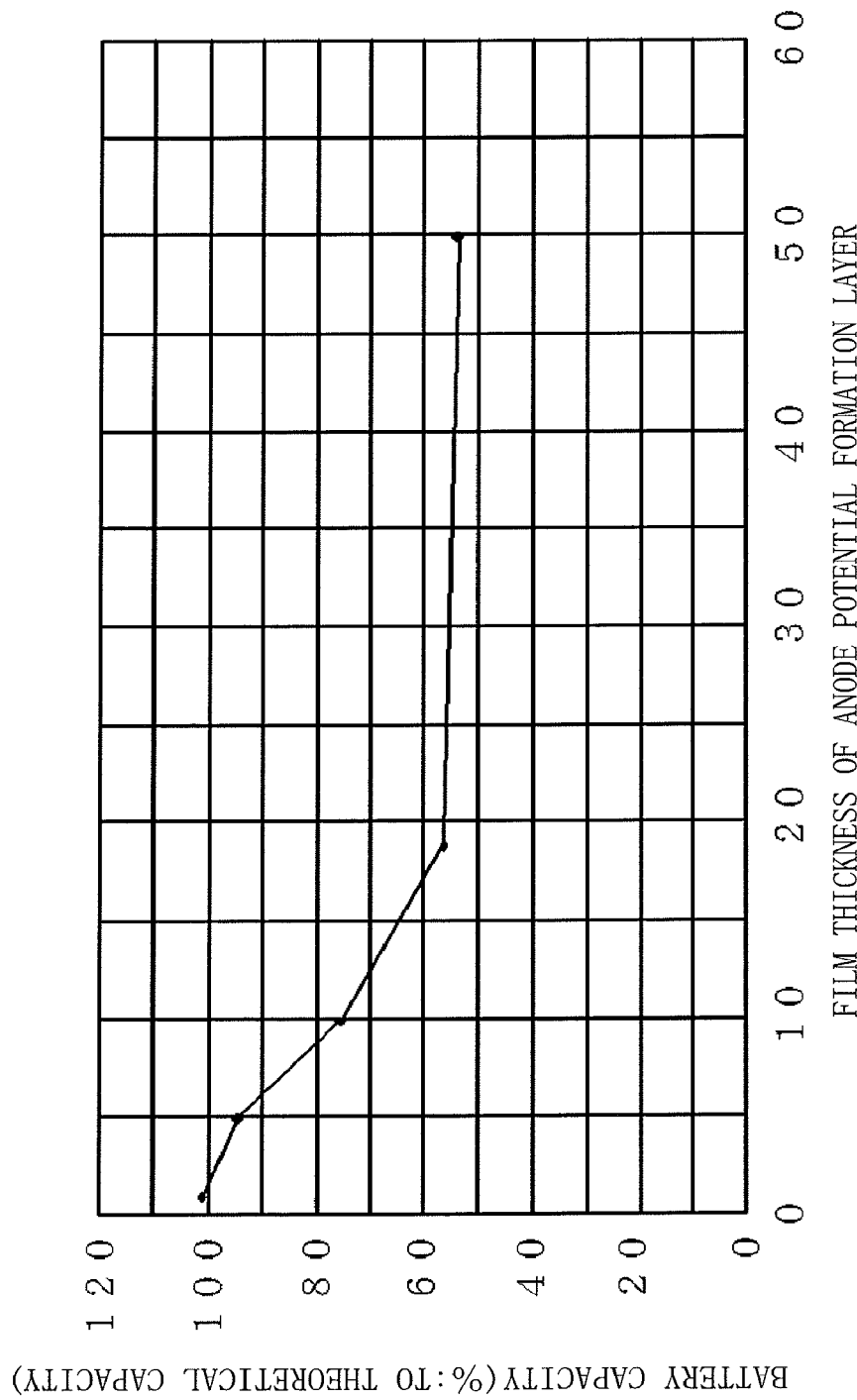
FIG. 17 is a diagram explaining relation between a discharge capacity and a thickness of the anode potential formation layers of the solid state lithium ion batteries in the example of the present invention.

FIG. 17 is a diagram explaining relation between a discharge capacity and a thickness of the anode potential formation layer of the solid state lithium ion batteries in Example 4 of the present invention.

In FIG. 17, the vertical axis indicates a battery capacity as a converted value where the theoretical capacity calculated from the film thickness of the cathode active material is 100% (referred to as "usage efficiency"). The horizontal axis indicates the thickness of the anode potential formation layer (nm). Here, the usage efficiency is a value obtained by dividing a capacity (battery capacity) capable of being used when the battery voltage reaches 1.5 V at the time of discharge by the theoretical capacity calculated from the film thickness of the cathode active material (expressed in percentage).

In addition, where the density of LiCoO$_1$ was 5.16 g/cm$^3$, in FIG. 17, battery discharge capacities when the film thicknesses of the anode potential formation layer were 1 nm, 5 nm, 10 nm, 19 nm, and 50 nm were respectively 100.8%, 94.4%, 75.6%, 55.9%, and 53.5% of the capacity expected from the theoretical capacity of 12.7 μAh/cm$^2$ of the cathode active material as illustrated in FIG. 20 described below.

As described above, as the film thickness of the anode potential formation layer was thinner, the battery capacity was increased. As illustrated in FIG. 17, usage efficiencies in the case that the thicknesses of the anode potential formation layer were 2 nm, 6 nm, 10 nm, 13 nm, and 20 nm were respectively lowered as about 100%, about 95%, about 90%, about 80%, and about 60%.

Thus, in the case where LiCoO$_2$ is used as a material composing the anode potential formation layer, the thickness of the anode potential formation layer is preferably 2 nm or more and 10 nm or less, the usage efficiency is able to be about 90% or more. Further, it is evident that the film thickness of the anode potential formation layer is thicker in order to effectively retain protective function to the anode-side current collector film. In the case where the film thickness of the anode potential formation layer is 2 nm or more and 20 nm or less, the usage efficiency is able to be about 80% or more, and lowering of the battery capacity can be regarded within the tolerable range.

Since FIG. 17 illustrates a battery capacity obtained where the voltage limit was 1.5 V, in the case where the film thickness of the anode potential formation layer exceeded 20 nm, the battery capacity was not much changed from that in the case that the film thickness of the anode potential formation layer was 20 nm. However, in terms of securing a range in which the battery is able to be driven at higher voltage than 2.5 V, in the context of the result of FIG. 16, it is evident that it is not preferable that the film thickness of the anode potential formation layer exceed 20 nm. Therefore, the upper limit of the film thickness is 20 nm.

In the case where the anode potential formation layer was composed of $LiCoO_2$, since the ion conductivity of the material composing the anode potential formation layer was high, the optimal film thickness range was different from that of Example 1 to Example 3 described above in which the anode potential formation layer was composed of $LiMn_2O_4$. Conductivities of $LiCoO_2$ and $LiMn_2O_4$ are respectively about $10^{-2}$ S/cm and about $10^{-6}$ S/cm. In the case where the ion conductivity of the anode potential formation layer is higher, even if the film thickness is larger than 20 nm, it is prospective that favorable function as the anode potential formation layer (anode-side current collector protective film) is obtained. Thus, the optimal film thickness range varies according to the ion conductivity of the anode potential formation layer.

In addition, as evidenced by the result illustrated in FIG. 16 ($LiCoO_2$ was used as a material composing the cathode active material film and the anode potential formation layer), battery capacities (discharge capacities) obtained where the voltage limit was 1.5 V were respectively 12.8 μAh/cm$^2$, 12.0 μAh/cm$^2$, 9.6 μAh/cm$^2$, 7.1 μAh/cm$^2$, and 6.8 ρAh/cm$^2$ in the batteries in which the film thicknesses of the anode potential formation layer were 1 nm, 5 nm, 10 nm, 19 nm, and 50 nm.

Where a capacity when the battery capacity (discharge capacity) became the maximum, that is, when the film thickness of the anode potential formation layer was 1 nm (referred to as maximum capacity) was 100%, battery capacities when the film thicknesses of the anode potential formation layer were 2 nm, 3 nm, 5 nm, 6 nm, 10 nm, 13 nm, and 20 nm (referred to as the relative battery capacity) were respectively 98.4%, 96.9%, 93.8%, 89.8%, 75%, 68.8%, and 55.4% as illustrated in FIG. 20 described below.

As evidenced by relation between the film thickness of the anode potential formation layer and the relative battery capacity (refer to FIG. 20 described below), in the case where $LiCoO_2$ is used as a material composing the anode potential formation layer, the following is attained. That is, in the case where the thickness of the anode potential formation layer is 2 nm or more and 20 nm or less, the battery capacity is able to be 55% or more of the maximum capacity. In the case where the thickness of the anode potential formation layer is 2 nm or more and 13 nm or less, the battery capacity is able to be 65% or more of the maximum capacity. In the case where the thickness of the anode potential formation layer is 3 nm or more and 10 nm or less, the battery capacity is able to be 75% or more of the maximum capacity. In the case where the thickness of the anode potential formation layer is 3 nm or more and 6 nm or less, the battery capacity is able to be 90% or more of the maximum capacity.

In Example 1 to Example 4 described above, the description has been given of the solid state lithium ion battery in which the anode potential formation layer and the cathode active material film are formed from the same material. Next, a description will be given of a solid state lithium ion battery in which the anode potential formation layer is formed from a material different from a material of the cathode active material film.

For example, as described below, it is possible that $LiMn_2O_4$ is used as the anode potential formation layer (anode-side current collector protective film), and $LiCoO_2$ is used as the cathode active material film. Even if the material composing the cathode active material film is not the same as the material composing the anode potential formation layer (anode-side current collector protective film), action effect similar to that of the anode potential formation layer described in Example 1 to Example 4 is able to be obtained.

Example 5

A description will be given of an example of a solid state lithium ion battery in which the cathode active material film was formed from $LiCoO_2$, and the anode potential formation layer was formed from $LiMn_2O_4$.

Respective films composing the battery were formed in the same manner as that of Example 1, and charge and discharge curves of the battery were measured in the same manner as that of Example 1. In addition, the $LiCoO_2$ film (cathode active material film) was formed in the same manner as that of Example 4 by adjusting sputtering time so that the film thickness became 125 nm. The $LiMn_2O_4$ film layer (anode potential formation layer) was formed in the same manner as that of Example 1 by adjusting sputtering time so that the film thickness became 5 nm.

The film structure of the fabricated battery was the polycarbonate substrate/$Si_3N_4$ (200 nm)/Ti (100 nm)/$LiCoO_2$ (125 nm)/$Li_3PO_4N$ (145 nm)/$LiMn_2O_4$ (5 nm)/Ti (200 nm)/ultraviolet curing resin (20 μm).

Figure 18:
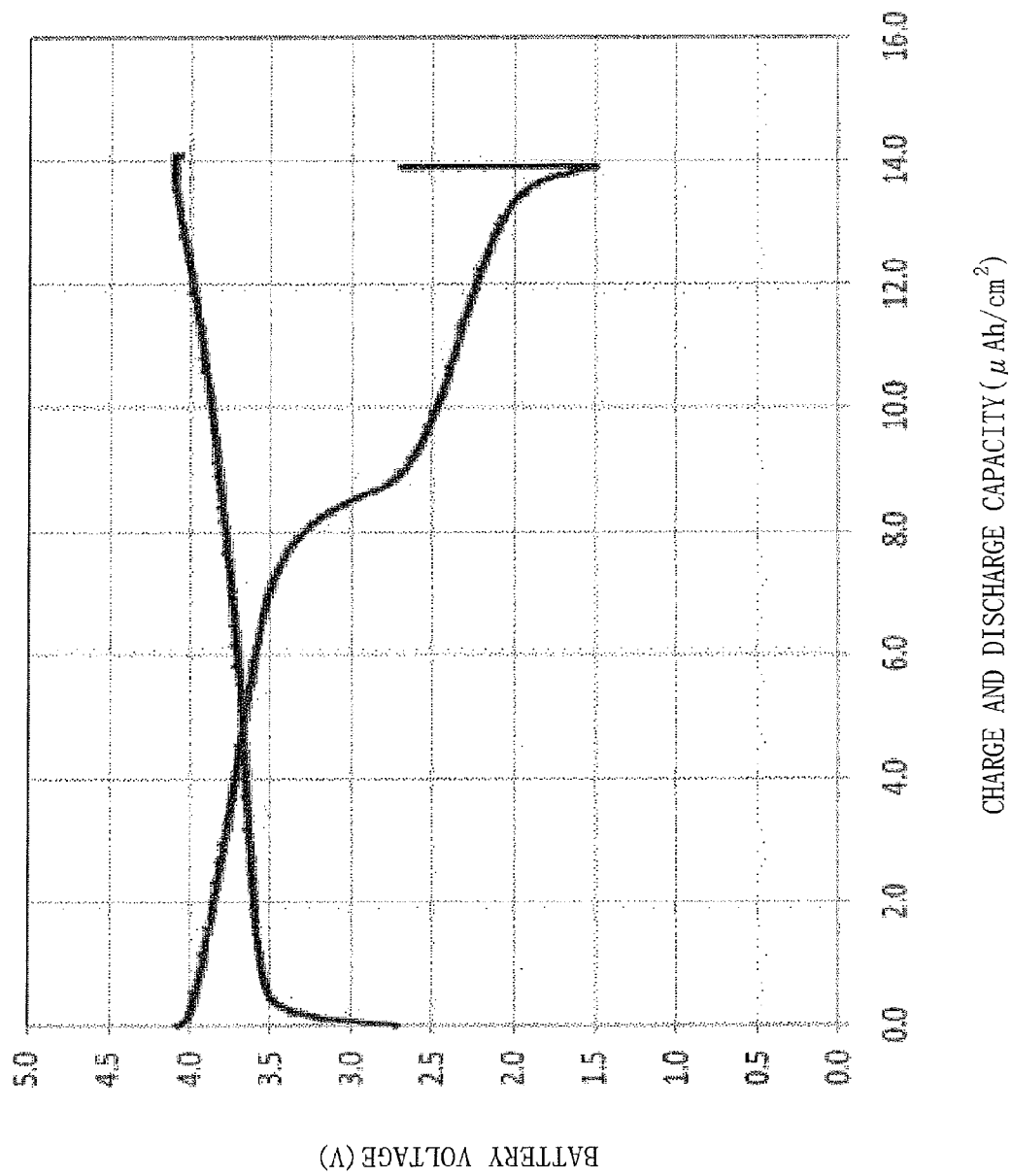
FIG. 18 is a diagram explaining charge and discharge characteristics of a solid state lithium ion battery in an example.

FIG. 18 is a diagram explaining charge and discharge characteristics of the solid state lithium ion battery in Example 5 of the present invention. The horizontal axis indicates a charge and discharge capacity (μAh/cm$^2$), and the vertical axis indicates a battery voltage (V).

In FIG. 18, the curve increasing and changing from bottom left to top right, and the curve decreasing and changing from top left to bottom right indicates a discharge curve. The charge curve indicates a 9th charge curve, and the discharge curve indicates a 10th discharge curve.

From the result illustrated in FIG. 18, where the density of $LiCoO_4$ was 5.16 g/cm$^3$, the discharge capacity of the battery in which the film thickness of the anode potential formation layer was 5 nm (capacity capable of being used when the battery voltage reached 1.5 V at the time of discharge) was 13.9 μAh/cm$^2$, which was 109.4% of the capacity expected based on the theoretical capacity of 12.7 μAh/cm$^2$ of the cathode active material.

As illustrated in FIG. 18, favorable charge and discharge curves were obtained, and capacity deterioration was kept several % due to at least 100 times or more repeated charge and discharge. It was found that the anode potential formation layer (anode-side current collector protective film) ideally functioned.

Next, relation between a battery capacity and a thickness of the anode potential formation layers of the solid state lithium ion batteries in the examples of the present invention described above will be illustrated.

Figure 19:
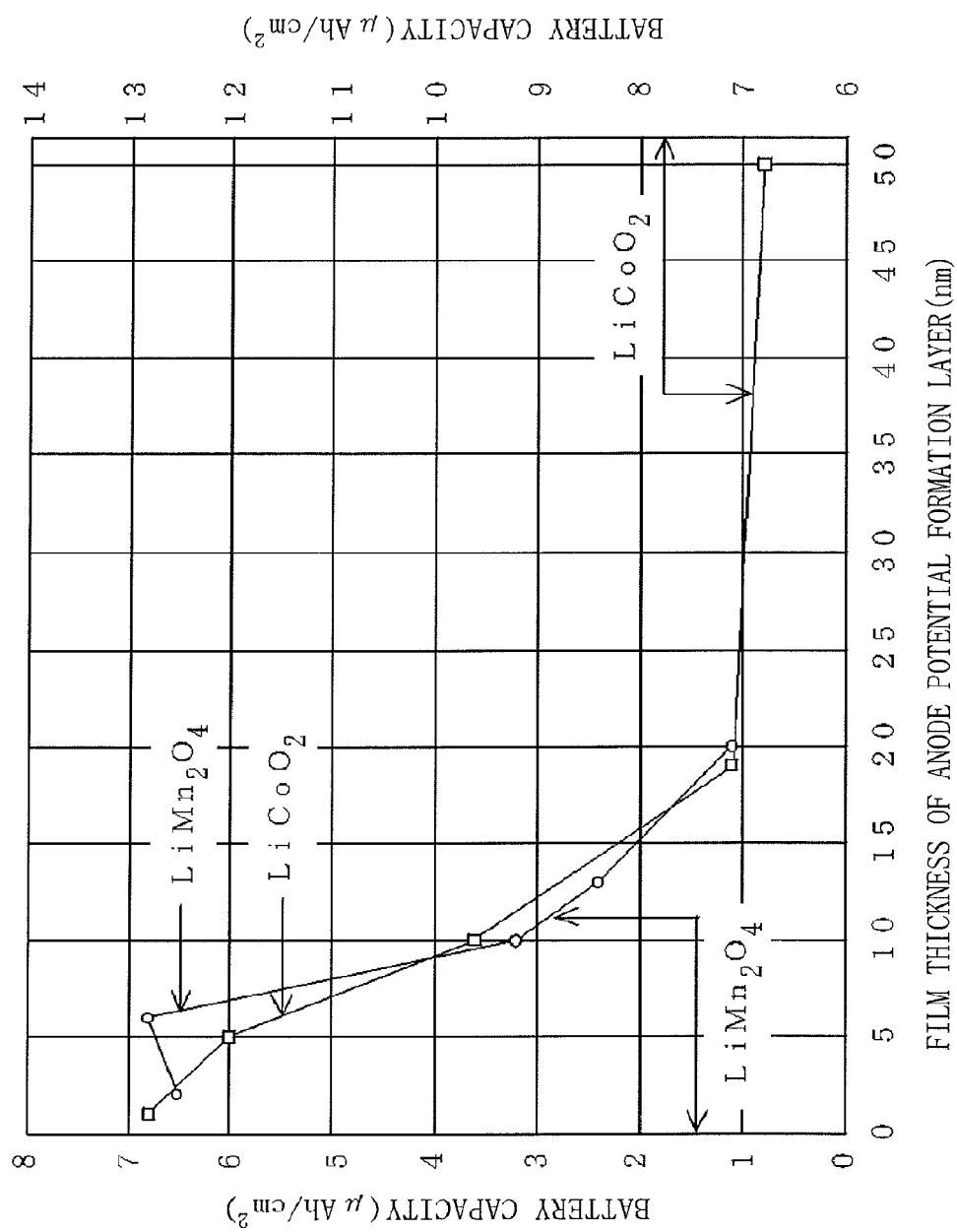
FIG. 19 is a diagram explaining relation between a battery capacity and a thickness of the anode potential formation layers of the solid state lithium ion batteries in the examples of the present invention.

FIG. 19 is a diagram explaining relation between a battery capacity and a thickness of the anode potential formation layers of the solid state lithium ion batteries in Example 3 and Example 4 of the present invention.

In FIG. 19, the horizontal axis indicates a thickness of the anode potential formation layers composed of $LiMn_2O_4$ and $LiCoO_2$, and the vertical axis indicates a discharge capacity ($\mu Ah/cm^2$). Result for $LiCoO_2$ is illustrated together with the result for $LiMn_2O_4$ illustrated in FIG. 13. In the case where the result for $LiMn_2O_4$ is moved in parallel, the result for $LiCoO_2$ is approximately overlapped with the result for $LiMn_2O_4$.

FIG. 20 is a diagram explaining relation between a battery capacity and a thickness of the anode potential formation layers of the solid state lithium ion batteries in Example 3 and Example 4 of the present invention.

In FIG. 20, the horizontal axis indicates a thickness of the anode potential formation layers composed of $LiMn_2O_4$ and $LiCoO_2$, and the vertical axis indicates a battery capacity (%:to the theoretical capacity) ("usage efficiency" described above) as a converted value where the theoretical capacity calculated from the film thickness of the cathode active material is 100%, and a battery capacity ("relative battery capacity" described above) as a relative value (%) of a battery capacity when the anode potential formation layer has a given film thickness where a capacity when the battery capacity becomes the maximum when the film thickness of the anode potential formation layer is changed (referred to as maximum capacity) is 100%. From the result illustrated in FIG. 20, it is evident that in the case where the anode potential formation layer is made of a material having high ion conductivity, even if the film thickness is large, the anode potential formation layer (anode-side current collector protective film) favorably functions.

Example 6

A description will be given of an example of a solid state lithium ion battery in which the anode potential formation layer was formed from $LiCoO_2$, and the cathode active material film was formed from $LiMn_2O_4$.

Respective films composing the battery were formed in the same manner as that of Example 1, and charge and discharge curves of the battery were measured in the same manner as that of Example 1. In addition, the $LiMnO_4$ film (cathode active material film) was formed in the same manner as that of Example 1 by adjusting sputtering time so that the film thickness became 180 nm. The $LiCoO_2$ layer (anode potential formation layer) was formed in the same manner as that of Example 4 by adjusting sputtering time so that the film thickness became 5 nm.

The film structure of the fabricated battery was the polycarbonate substrate/$Si_3N_4$ (200 nm)/Ti (100 nm)/$LiMnO_4$ (180 nm)/$Li_3PO_4N_x$ (480 nm)/$LiCoO_2$ (5 nm)/Cu (20 nm)/Ti (180 nm)/ultraviolet curing resin (20 $\mu$m).

As charge and discharge characteristics curves of the solid state lithium ion battery in Example 6 of the present invention, the basically same curves as the charge and discharge characteristics curves of the solid state lithium ion battery in which the $LiMn_2O_4$ film was used as a cathode active material film were obtained.

As described above, according to the present invention, even if the films composing the thin film lithium ion battery are formed from the amorphous film, a high-performance thin film solid state lithium ion secondary battery which is able to be charged and discharged in the air, which enables stable driving, which has a high battery capacity and a high output voltage, in which lowering of the battery capacity is small, which has high durability to repeated charge and discharge (repeated charge and discharge durability), and which has superior charge and discharge characteristics is able to be achieved.

Further, even if the films composing the battery are formed from the amorphous film, since the battery is formed on the inorganic insulating film provided on the substrate face, a high-performance and inexpensive thin film solid state lithium ion secondary battery which is able to be charged and discharged in the air, which enables stable driving, which is able to improve durability, and which is able to be manufactured stably at an improved manufacturing yield is able to be achieved.

The present invention has been described with reference to the embodiments. However, the present invention is not limited to the foregoing embodiments and the foregoing examples, and various modifications may be made based on the technical idea of the present invention.

INDUSTRIAL APPLICABILITY

The present invention is able to provide a high-performance and inexpensive thin film lithium ion battery that is able to be operated in the air, that enables stable driving, and that is able to improve manufacturing yield, charge and discharge characteristics, and repeated charge and discharge durability is able to be provided.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A battery comprising:
 a substrate;
 a cathode-side current collector film;
 a cathode active material film;
 a solid electrolyte film;
 an anode potential formation layer; and
 an anode-side current collector film, wherein:
  the cathode-side current collector film, the cathode active material film, the solid electrolyte film, the anode potential formation layer, and the anode-side current collector film are formed on the substrate;
  the anode potential formation layer comprises $LiCoO_2$, and
  a film thickness of the anode potential formation layer is 2 nm or more and 13 nm or less.

2. The battery according to claim 1, wherein the film thickness of the anode potential formation layer is 3 nm or more and 10 nm or less.

3. The battery according to claim 1, wherein the film thickness of the anode potential formation layer is 3 nm or more and 6 nm or less.

4. The battery according to claim 1, wherein the cathode active material film comprises a different material from the anode potential formation layer.

5. The battery according to claim 1, wherein the cathode active material film comprises at least one of $LiCoO_2$ and $LiMn_2O_4$.

6. The battery according to claim 1, wherein the cathode active material film comprises an oxide containing Li and at least one of Mn, Co, Fe, P, Ni, Si, and Cu.

7. The battery according to claim 1, further comprising a protective film that covers at least one of the cathode-side current collector film, the cathode active material film, the solid electrolyte film, the anode potential formation layer, and the anode-side current collector film.

8. The battery according to claim 1, wherein the cathode-side current collector film or the anode-side current collector film comprises Cu, Mg, Ti, Fe, Co, Ni, Zn, Al, Ge, In, Au, Pt, Ag, Pd or an alloy thereof.

9. The battery according to claim 1, wherein at least one of the cathode active material film, the solid electrolyte film and the anode potential formation layer is an amorphous film.

10. The battery according to claim 1, wherein at a time of charging the battery, an Li-excessive layer is formed by providing the anode potential formation layer.

11. The battery according to claim 1, wherein the substrate comprises at least one of a polycarbonate (PC) resin, a fluorine resin, a polyethylene terephthalate (PET), a polybutylene terephthalate (PBT), a polyimide (PI), a polyamide (PA), a polysulfone (PSF), a polyether sulfone (PES), a polyphenylene sulfide (PPS) and a polyether ether ketone (PEEK).

12. An electronic device comprising the battery according to claim 1.

13. An electric circuit board comprising the battery according to claim 1 built onto the electric circuit board.

14. A flexible battery comprising the battery according to claim 1.

15. An electronic money card comprising the flexible battery according to claim 14.

16. An RFID tag comprising the flexible battery according to claim 14.

17. The battery according to claim 1, wherein a potential difference between the anode potential formation layer and the cathode active material film is a given value or less.

18. The battery according to claim 17, wherein the given value is 2V.

19. The battery according to claim 1, wherein:
the substrate comprises an organic resin;
an insulating film comprising an inorganic material is provided on a face of the substrate; and
at least one of the cathode-side current collector film and the anode-side current collector film is formed on a face of the insulating film.

20. The battery according to claim 19, wherein an area of the insulating film is larger than an area of the cathode-side current collector film or the anode-side current collector film, or a total area of the cathode-side current collector film and the anode-side current collector film.

21. The battery according to claim 19, wherein the cathode-side current collector film, the cathode active material film, the solid electrolyte film, the anode potential formation layer, and the anode-side current collector film are sequentially formed on the insulating film, and constitute a laminated body; and
further comprising an overall protective film entirely covering the laminated body and the insulating film.

22. The battery according to claims 21, wherein at least one of the protective film and the overall protective film comprises an ultraviolet curing resin.

23. The battery according to claim 21, wherein there are a plurality of the laminated bodies electrically connected in series and covered by the overall protective film.

24. The battery according to claim 21, wherein there are a plurality of the laminated bodies that are arranged in line on the insulating film and electrically connected in parallel and covered by the overall protective film.

25. The battery according to claim 21, wherein at least one of the cathode active material film, the solid electrolyte film and the anode potential formation layer is an amorphous film.

26. The battery according to claim 19, further comprising:
a first laminated body including the cathode-side current collector film and the cathode active material film; and
a second laminated body including the anode potential formation layer and the anode-side current collector film;
wherein the solid electrolyte film is formed to cover the first laminated body and the second laminated body arranged in line on the insulating film.

27. The battery according to claim 26, wherein a plurality of the first and second laminated bodies are arranged in line on the insulating film and electrically connected.

28. The battery according to claim 26, wherein an overall protective film entirely covers the solid electrolyte film.

29. The battery according to claim 26, wherein at least one of the cathode active material film, the solid electrolyte film and the anode potential formation layer is an amorphous film.

30. The battery according to claim 19, wherein a thickness of the insulating film is 5 nm or more and 500 nm or less.

31. The battery according to claim 30, wherein the thickness of the insulating film is 10 nm or more and 200 nm or less.

32. The battery according to claim 19, wherein the insulating film comprises at least one of an oxide, a nitride, or a sulfide of Si, Cr, Zr, Al, Ta, Ti, Mn, Mg, Zn, or a mixture thereof.

* * * * *

UNITED STATES PATENT AND TRADEMARK OFFICE
CERTIFICATE OF CORRECTION

PATENT NO. : 10,403,927 B2
APPLICATION NO. : 15/585951
DATED : September 3, 2019
INVENTOR(S) : Yuichi Sabi et al.

It is certified that error appears in the above-identified patent and that said Letters Patent is hereby corrected as shown below:

In the Claims

At Column 34, Lines 11-13, please delete Claim 22 in its entirety and replace it with:
22. The battery according to claim 21, wherein the overall protective film comprises an ultraviolet curing resin.

Signed and Sealed this
Fourteenth Day of January, 2020

Andrei Iancu
*Director of the United States Patent and Trademark Office*